Nov. 23, 1965

W. L. LIVINGSTON 3,219,815

INTERLOCKING SYSTEM FOR RAILROADS

Filed Nov. 3, 1960

INVENTOR.
W. L. LIVINGSTON
BY
Forest B. Hitchcock
HIS ATTORNEY

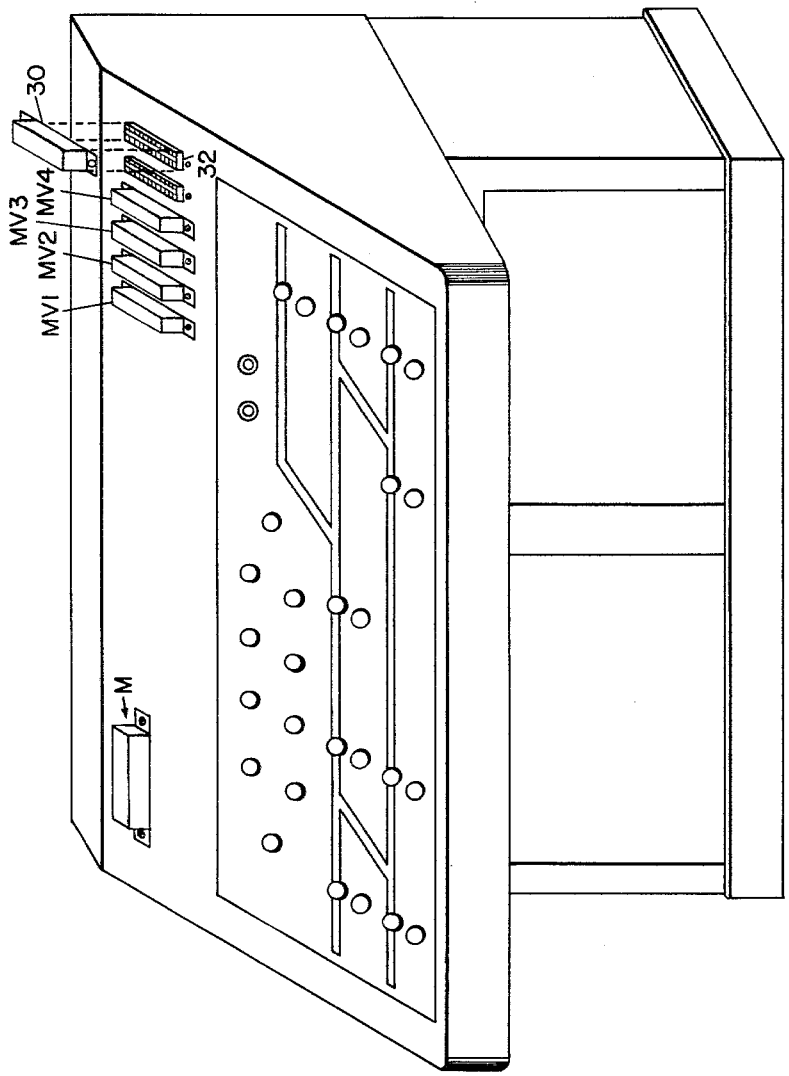

Nov. 23, 1965 — W. L. LIVINGSTON — 3,219,815
INTERLOCKING SYSTEM FOR RAILROADS
Filed Nov. 3, 1960 — 21 Sheets-Sheet 3

INVENTOR.
W. L. LIVINGSTON
BY
HIS ATTORNEY

INVENTOR.
W. L. LIVINGSTON
BY
Forest N. Hitchcock
HIS ATTORNEY

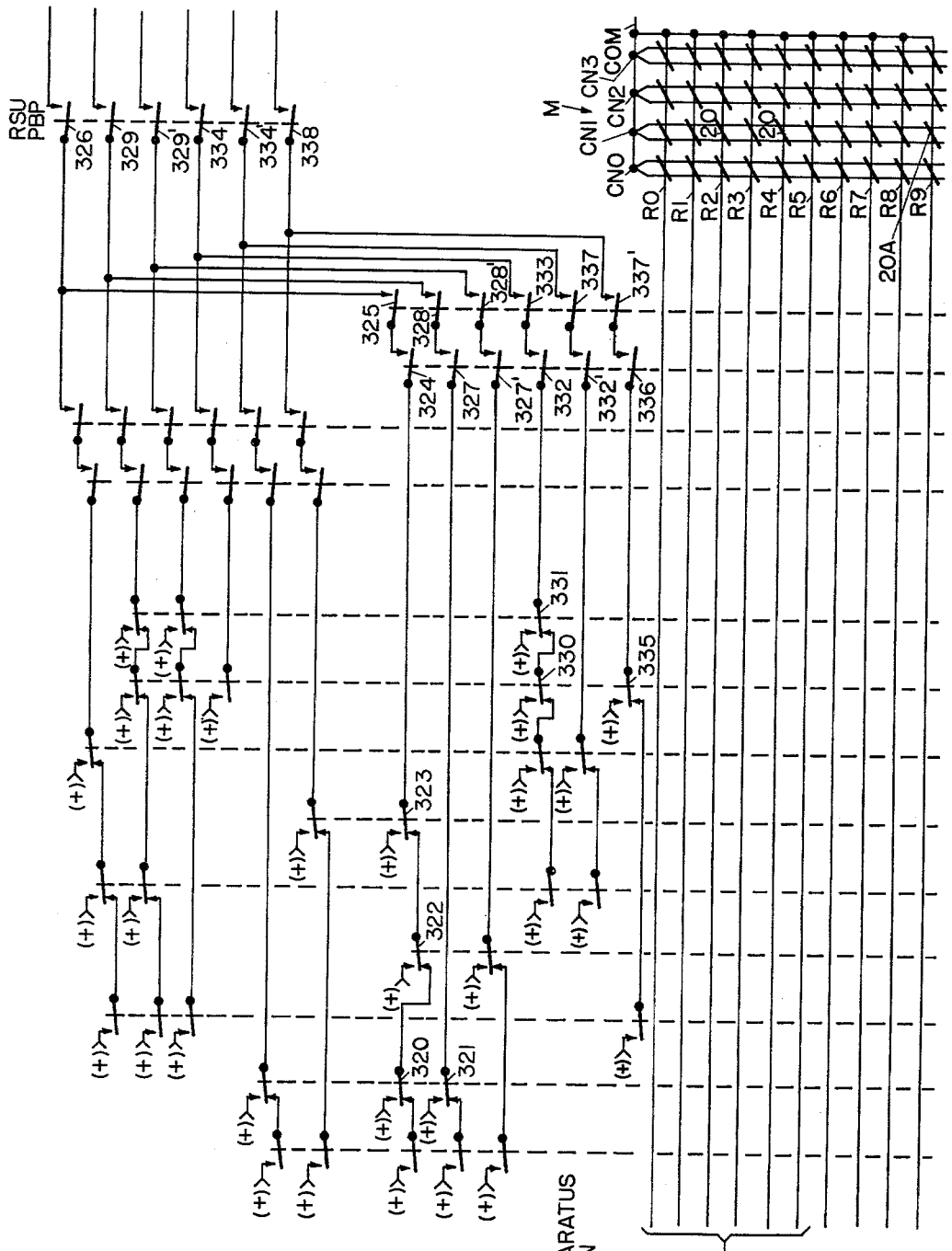

Nov. 23, 1965   W. L. LIVINGSTON   3,219,815
INTERLOCKING SYSTEM FOR RAILROADS
Filed Nov. 3, 1960   21 Sheets-Sheet 6
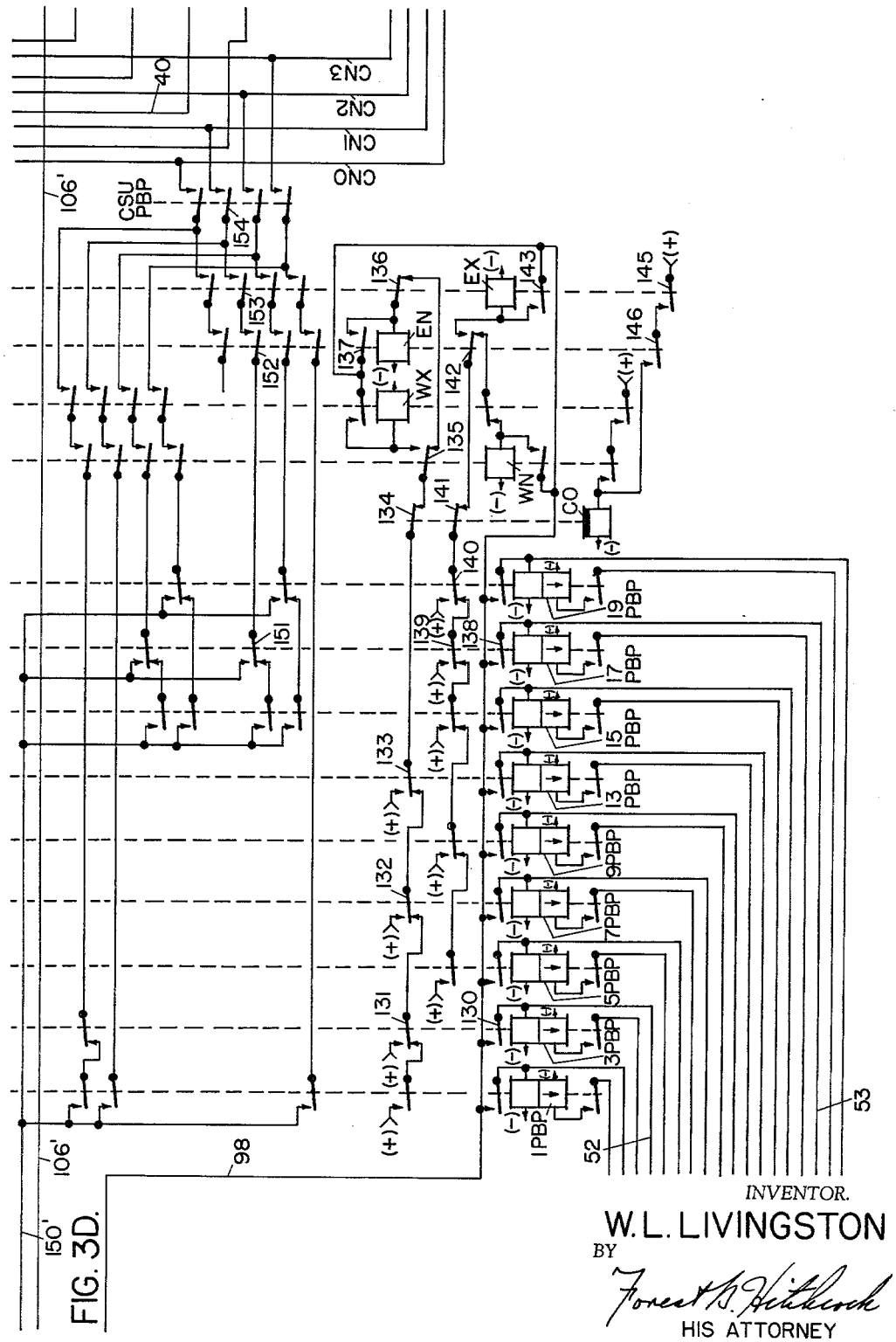
INVENTOR.
W. L. LIVINGSTON
BY
HIS ATTORNEY Nov. 23, 1965    W. L. LIVINGSTON    3,219,815
INTERLOCKING SYSTEM FOR RAILROADS
Filed Nov. 3, 1960    21 Sheets-Sheet 7
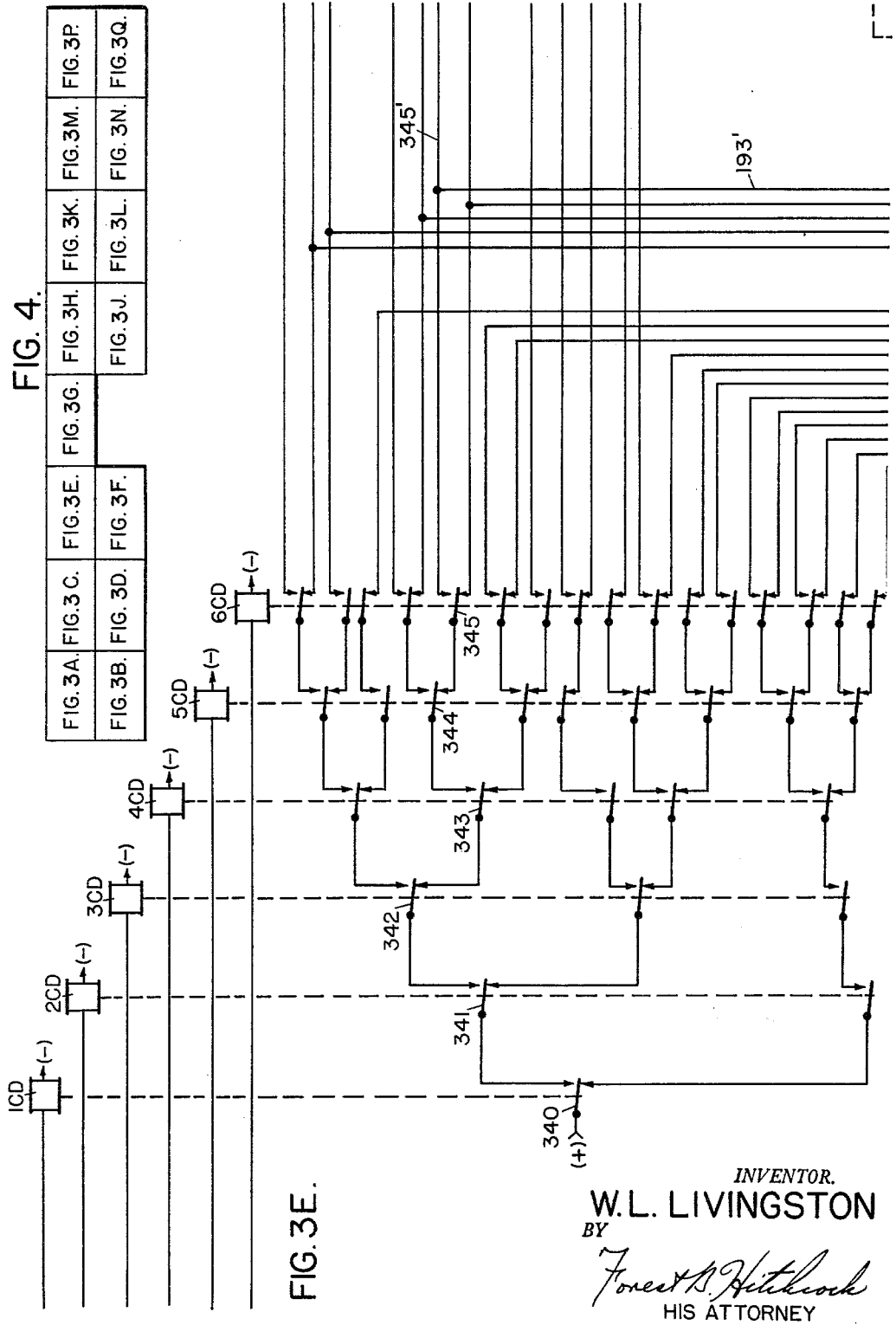
*INVENTOR.*
W. L. LIVINGSTON
BY
Forest B. Hitchcock
HIS ATTORNEY

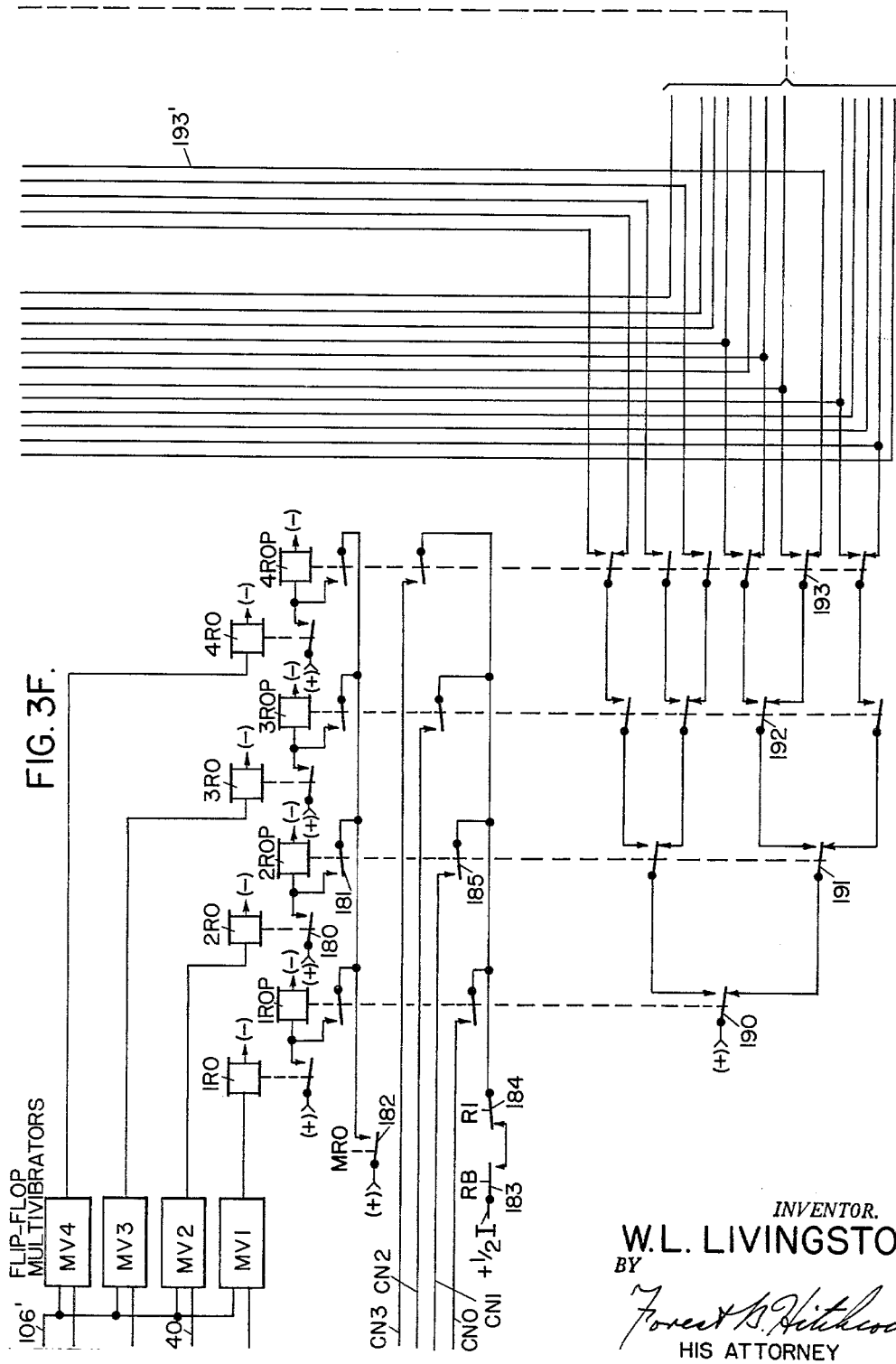

INVENTOR.
W.L. LIVINGSTON
BY
HIS ATTORNEY

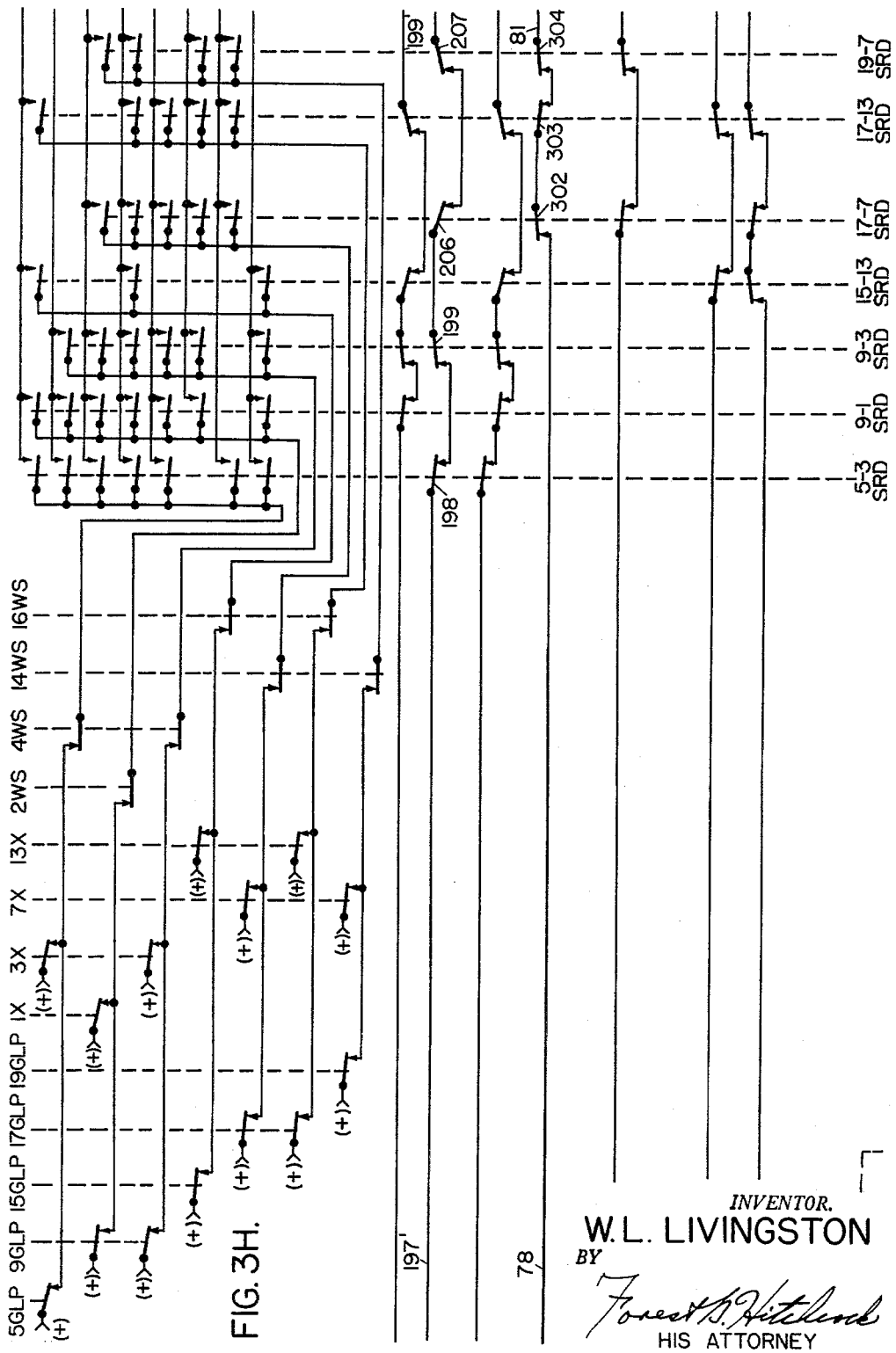

INVENTOR.
W. L. LIVINGSTON
BY
Forest D. Hitchcock
HIS ATTORNEY

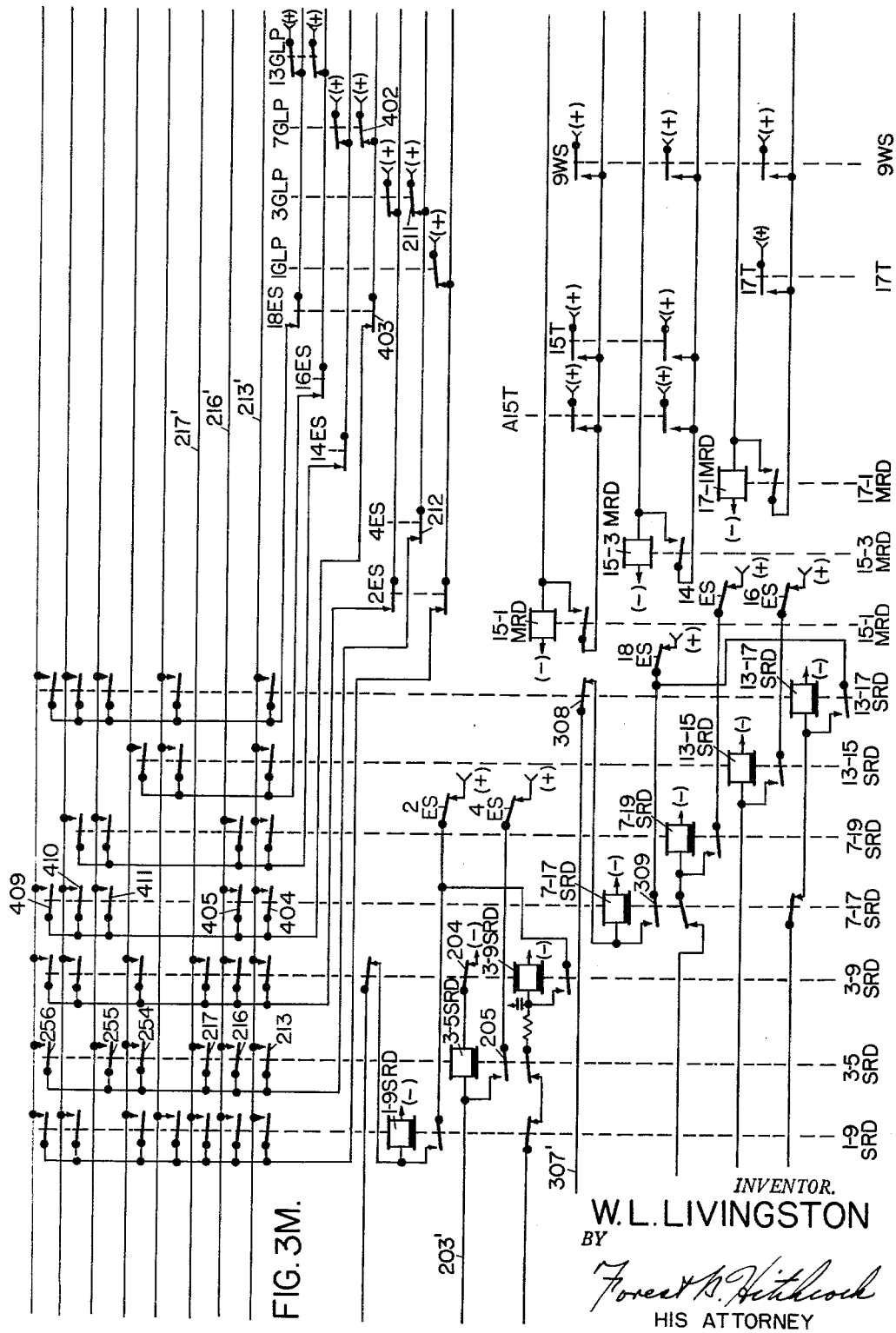

Nov. 23, 1965　　　　W. L. LIVINGSTON　　　　3,219,815
INTERLOCKING SYSTEM FOR RAILROADS
Filed Nov. 3, 1960　　　　　　　　　　　　21 Sheets-Sheet 15

INVENTOR.
W. L. LIVINGSTON
BY
HIS ATTORNEY

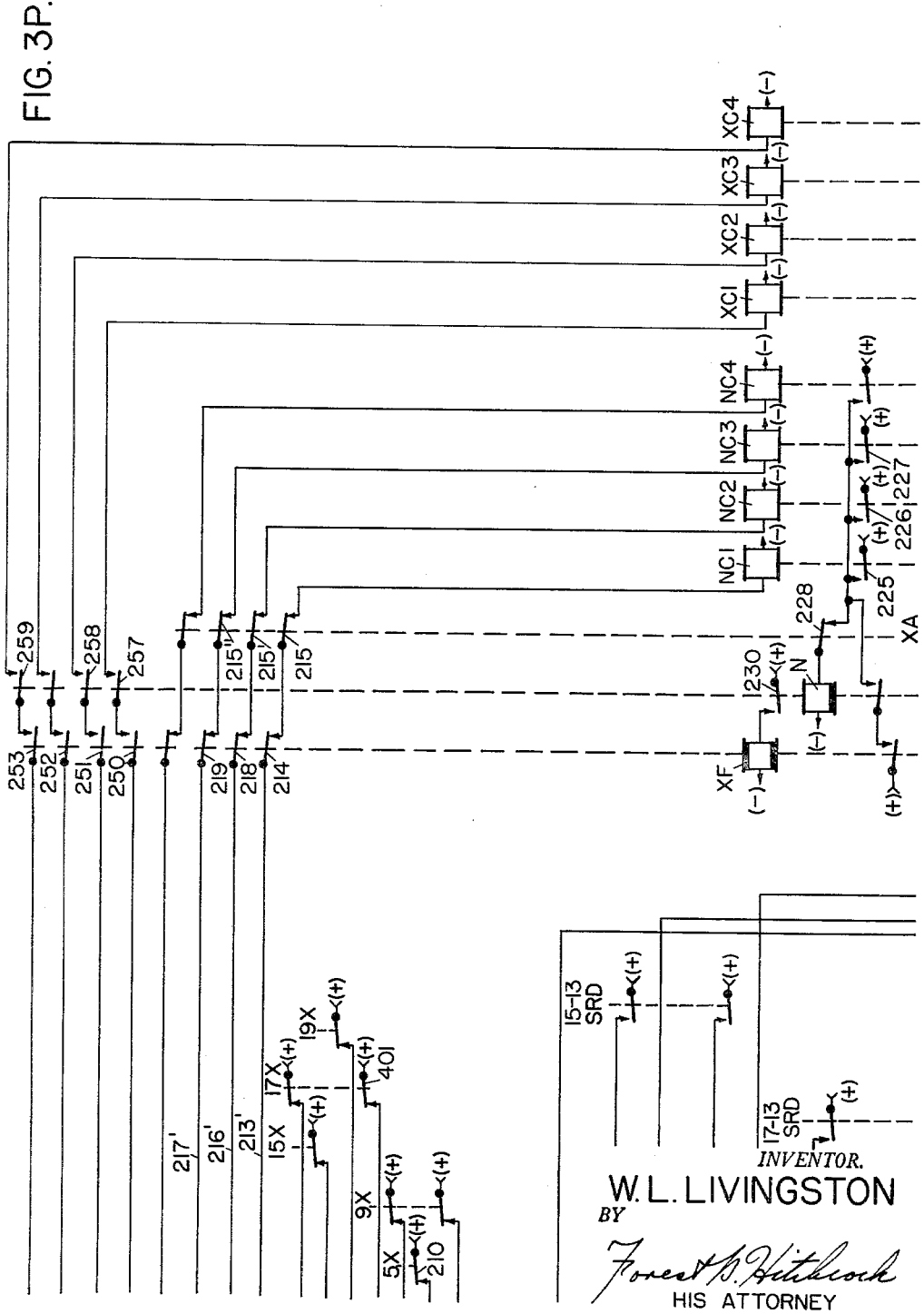

Nov. 23, 1965

W. L. LIVINGSTON 3,219,815

INTERLOCKING SYSTEM FOR RAILROADS

Filed Nov. 3, 1960

INVENTOR.
W. L. LIVINGSTON
BY
Forest N. Hitchcock
HIS ATTORNEY

Nov. 23, 1965

W. L. LIVINGSTON 3,219,815

INTERLOCKING SYSTEM FOR RAILROADS

Filed Nov. 3, 1960

INVENTOR.
W. L. LIVINGSTON
BY
Forest N. Hitchcock
HIS ATTORNEY

INVENTOR.
W. L. LIVINGSTON
BY
Forest B. Hitchcock
HIS ATTORNEY

Nov. 23, 1965  W. L. LIVINGSTON  3,219,815
INTERLOCKING SYSTEM FOR RAILROADS
Filed Nov. 3, 1960  21 Sheets-Sheet 20

INVENTOR.
W. L. LIVINGSTON
BY
Forest B. Hitchcock
HIS ATTORNEY

Nov. 23, 1965    W. L. LIVINGSTON    3,219,815
INTERLOCKING SYSTEM FOR RAILROADS
Filed Nov. 3, 1960    21 Sheets-Sheet 21

INVENTOR.
W. L. LIVINGSTON
BY
Forest B. Hitchcock
HIS ATTORNEY

United States Patent Office 3,219,815
Patented Nov. 23, 1965

3,219,815
INTERLOCKING SYSTEM FOR RAILROADS
Waitrus L. Livingston, Rochester, N.Y., assignor to
General Signal Corporation
Filed Nov. 3, 1960, Ser. No. 73,934
18 Claims. (Cl. 246—3)

The present invention relates to switch and signal control systems for railroads, and more particularly to such systems of the entrance-exit type.

Specifically, the present invention relates to an entrance-exit system whereby a control machine is provided at a control office having a control panel upon which is a miniature track diagram of a track layout for which the system is provided; and wherein the establishment of each route through the track layout is caused by actuating certain control buttons on the track diagram at points corresponding to the respective entrance and exit ends of routes, such ends being usually defined at the track layout by the location of wayside signals.

At the present time, in these entrance-exit systems, commonly called NX interlocking systems, the operator actuates suitable entrance and exit buttons on the control panel as route designating means, which in turn controls route selecting relays constituting route selecting means. The route selecting means, in turn, is effective to actuate route establishing means to operate the switches and signals for a particular route when an approaching train and its destination is announced to him by telephone or other communication means. Although these present NX interlocking systems permit the operator to safely route an approaching train from an entrance point to an exit point without fear of creating unsafe traffic conditions, it is necessary that he be constantly vigilant for information concerning the arrival of incoming trains and the particular routes that they are to take, in order to insure the rapid and efficient flow of railway traffic.

According to the present invention, a storage matrix is provided which is controlled by the route designating means to store the designation of several conflicting routes at the same time for the passage of respective trains. Thus a row in the matrix, for example, is selected according to the train identity and track on which it can be expected to arrive, and a column is selected in accordance with the designated route. When a train approaches the interlocking plant, route selecting means is actuated in accordance with the route identity stored for that train in the matrix to select the positions of the track switches required for the establishment of the route. Route establishing means is actuated in response to the route selecting means to power operate the track switches as required for the establishment of the route that has been selected.

One of the objects of the present invention is to provide an entrance-exit interlocking system having means for introducing route information into the system and storing this information indefinitely.

Another object of this invention is to provide an entrance-exit interlocking system wherein information for designating a plurality of routes may be introduced into the system and stored indefinitely, and the presence of a train approaching the area controlled by the system operates the switches and signals according to one of the preselected stored routes.

Another object of this invention is to provide an entrance-exit interlocking system having means for storing indefinitely train identify and route designating information in the system, whereby the presence of a particular identified train approaching the entrance to the area controlled by the system will control the switches and signals for routing the train over a preselected stored route.

Another object of this invention is to provide an entrance-exit interlocking system having means for storing more than one route for a particular train.

Still another object of this invention is to provide an entrance-exit interlocking system wherein the operator can introduce information into the system for storing a particular route to later operate the system as caused by the presence of a train, and also to immediately operate the switches and signals in a selected route in response to the operation of suitable buttons on the control panel.

Still another object of this invention is to provide an entrance-exit interlocking system wherein a particular route may be designated manually by actuating the appropriate buttons on the control panel without storing the information in the system, and without disturbing the train and route information already stored therein.

A further object of this invention is to provide an entrance-exit interlocking system whereby information may be introduced and stored into the system regardless of the traffic conditions prevailing in the area controlled by the system.

A further object of this invention is to provide an entrance-exit interlocking system whereby the presence of a train approaching the entrance end of the system causes the switches and signals to be actuated according to a predetermined stored route, and also causes that same route to be again stored in the system to be effective when the same train again approaches the entrance to the system.

A further object to this invention is to provide an entrance-exit system having means for permitting a first train to travel over a predetermined stored route, and for delaying the entrance of another train whose designated route is also stored in the system until such time as traffic conditions make it safe for the second train to travel over its designated route.

A still further object of this invention is to provide an entrance-exit interlocking system which permits more than one train to travel over non-conflicting stored routes simultaneously.

A still further object of this invention is to provide an entrance-exit system of the character described whereby the operator can permit the travel of a train over a manually designated non-conflicting route while another train is traveling over a predetermined route as stored in the system.

A still further object of this invention is to provide an entrance-exit interlocking system whereby means are provided for cancelling the route information stored in the system for one or more trains without disturbing the other route information stored therein; and also, where more than one route is stored in the system for one particular train, means are provided to cancel only one of those routes.

A still further object of this invention is to provide an entrance-exit interlocking system of the character described which incorporates the necessary fail-safe and interlocking features for the safe and efficient flow of railway traffic.

Other objects of this invention will become apparent from the specification, the drawings, and the appended claims.

In the drawings:

FIG. 2 is a view in perspective of a typical control unit for operating a system according to the illustrated embodiment of the present invention;

Figure 3A:
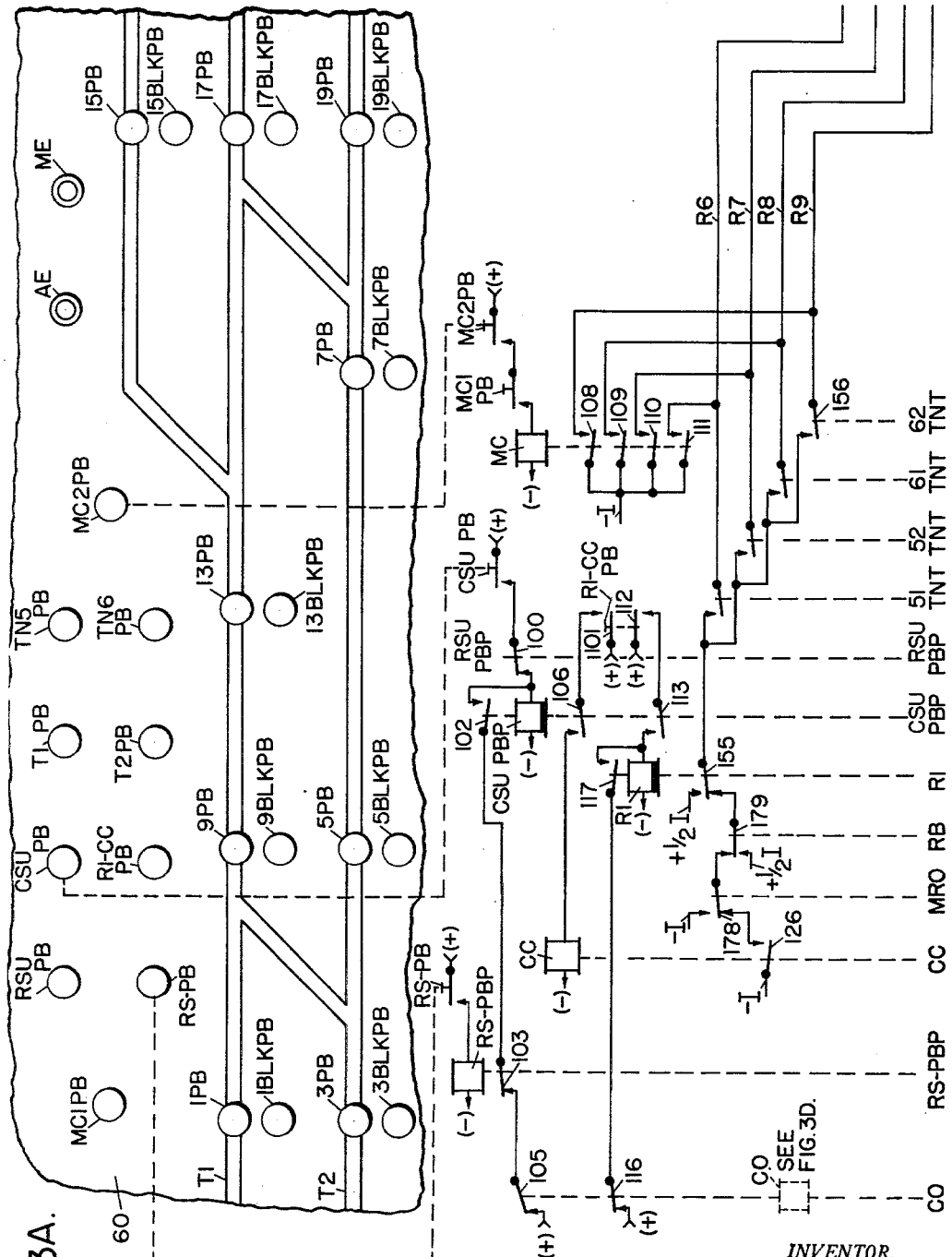
Figure 5A:
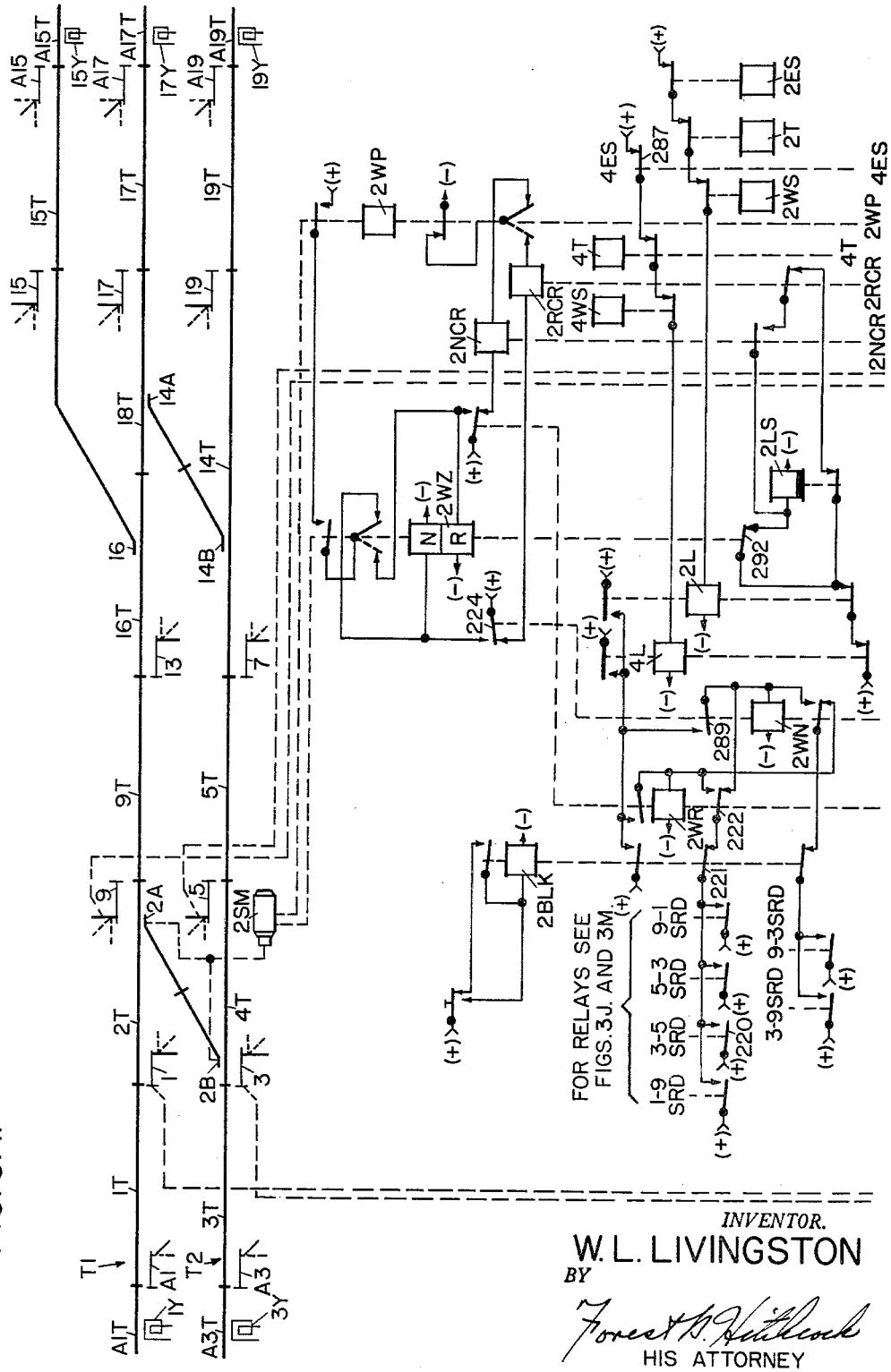
Figure 5B:
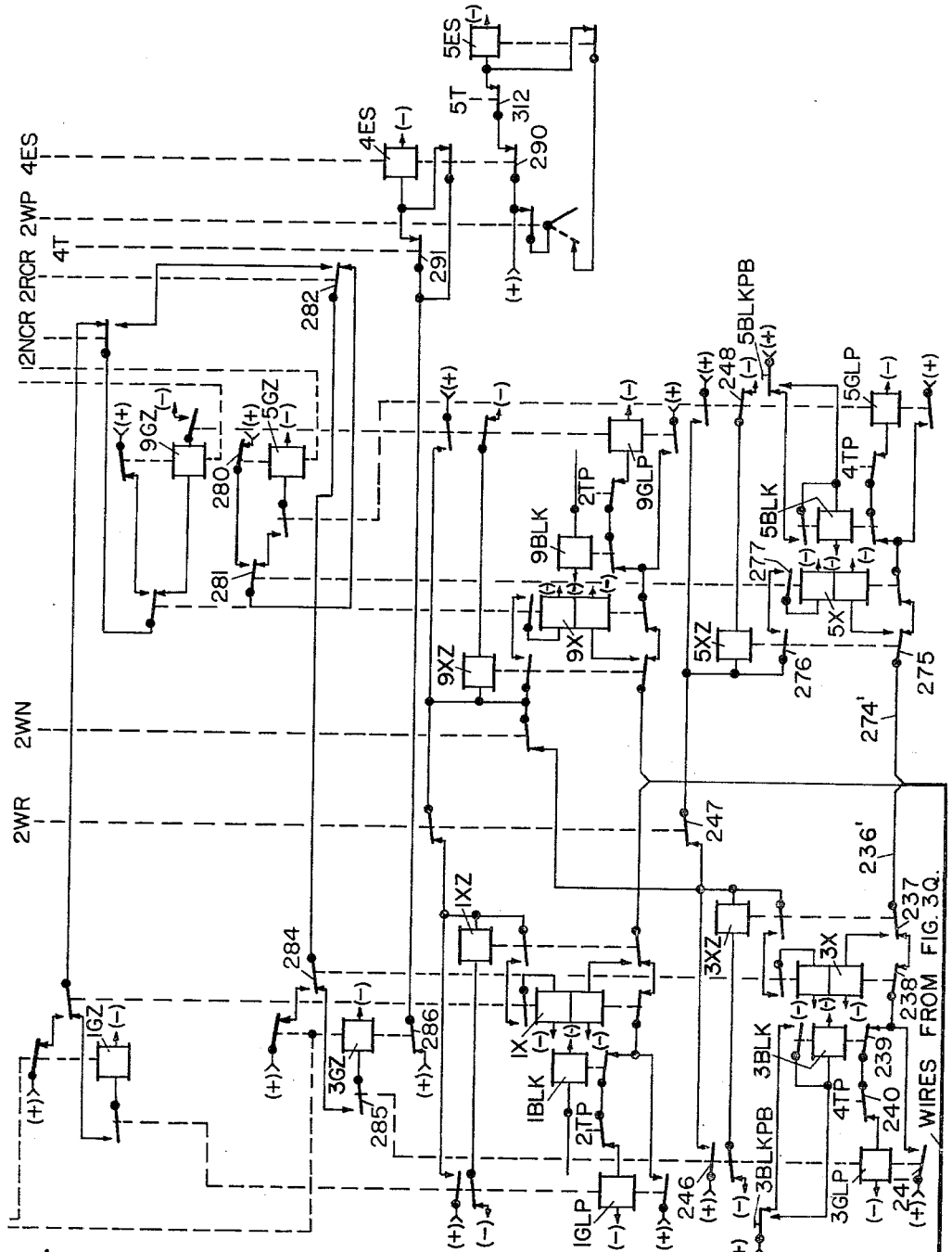
Figure 6:
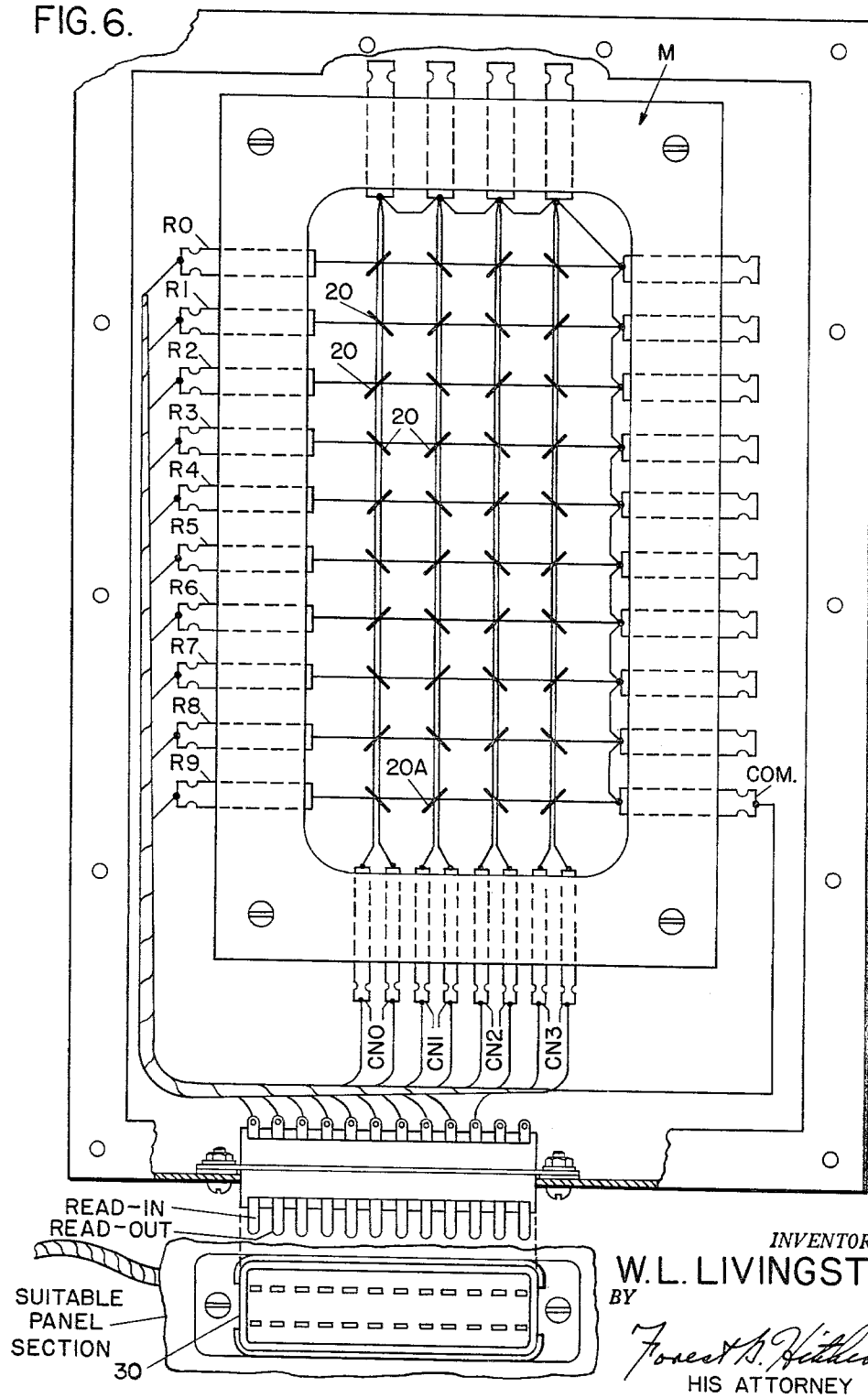
Figure 7:
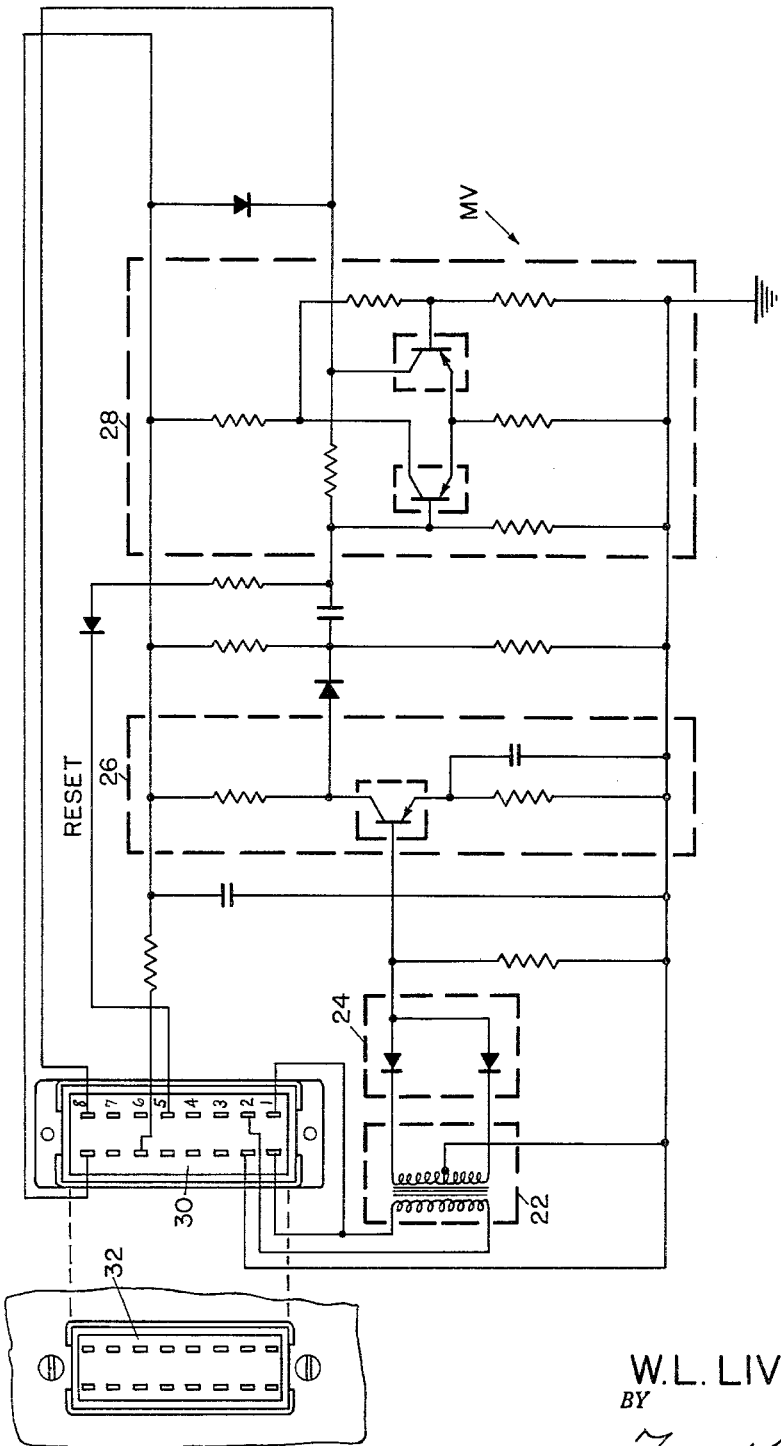

FIGS. 3A through 3Q (FIGS. 3I and 3O being omitted) when arranged according to the diagram illustrated in FIG. 4 illustrates diagrammatically the apparatus and circuitry of the system according to one embodiment of the invention;

FIG. 4 illustrates the arrangement of FIGS. 3A through 3Q (FIGS. 3I and 3O being omitted);

FIGS. 5A and 5B when placed side by side illustrate diagrammatically the apparatus in the control office for controlling certain of the switches and signals in the track layout according to this embodiment of the invention; and also illustrates a track layout for which this embodiment of the invention is provided;

FIG. 6 illustrates a typical wiring plan for a ferrite matrix used in the system of the present invention; and FIG. 7 is a schematic diagram of a transistor digital readout unit used in the system of this embodiment of the invention.

For the purpose of facilitating the disclosure of the present invention, the illustrations have been provided principally as schematic wiring diagrams arranged more particularly to clearly illustrate the mode of operation of the system than to specifically illustrate the structure and arrangement of parts that are provided in practice. Thus, the various relays and their contacts are illustrated in a conventional manner, and certain contacts and windings of relays are shown in the conventional relay circuit form for the purpose of simplifying the illustrations.

Figure 1:
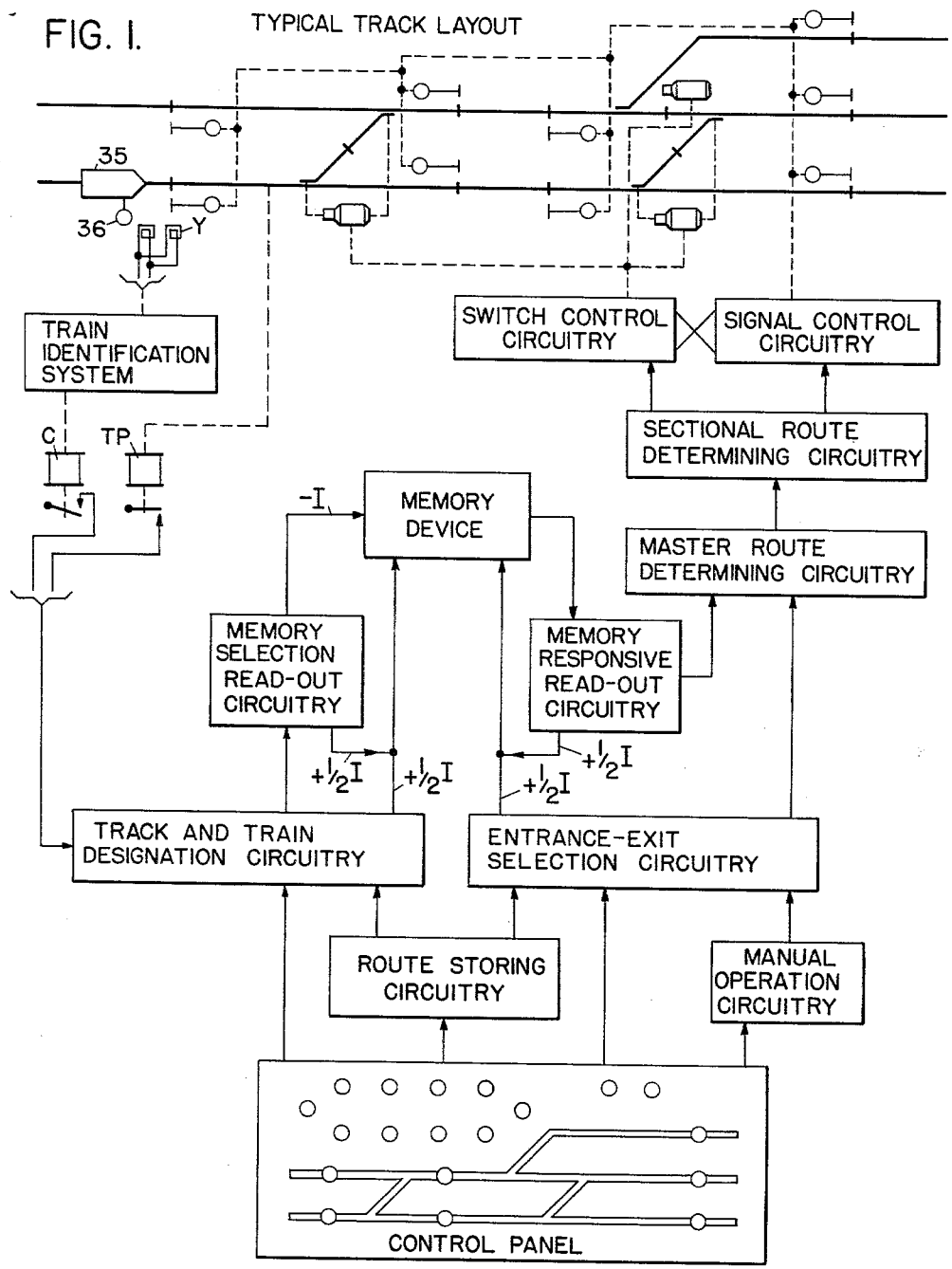
FIG. 1 is a block diagram showing diagrammatically the general arrangement of the system according to one embodiment of the invention.

The track layout used for this embodiment of the invention as illustrated in FIG. 1 and FIG. 5A is selected to facilitate disclosure of the principles of operation for the system provided by the present invention, and it is to be understood that the present invention is not limited to the specific track layout shown. It will be readily apparent as the description progresses that the principles of operation described with respect to the specific track layout shown are readily applicable to other more complex track layouts to be encountered in practice.

With reference to FIG. 5A, the track layout used for this embodiment of the invention comprises two parallel main tracks T1 and T2 interconnected by cross-overs, and the track T1 having another track connected thereto by a single track switch 16. One cross-over is provided with track switches 2A and 2B, and the other cross-over is provided with track switches 14A and 14B associated therewith. The main track T1 is divided into track sections including section A1T, 1T, 2T, 9T, 16T, 18T, 17T and A17T. The track T2 is divided into track sections A3T, 3T, 4T, 5T, 14T, 19T and A19T. The track leading into the track T1 is divided into track sections 15T and A15T.

Signals are provided for governing entrance in each of the routes in both directions, the signals A3, 3 and 7 are provided for governing eastbound traffic on track T2, and the signals A19, 19, and 5 are provided for governing westbound traffic on track T2. Signals A1, 1 and 13 are provided for governing eastbound traffic on track T1, and signals A17, 17 and 9 are provided for governing westbound traffic over track T1. Signals A15 and 15 are provided to govern the entrance of trains into the system over the track section A15T and 15T respectively. The track switches 2A and 2B, 16 and 14A and 14B are power operated by suitable electrically controlled switch machines which are well-known in the art. A conventional switch machine motor 2SM is illustrated in FIG. 5A for controlling the operation in the cross-over switches 2A and 2B. Although not specifically shown, it is understood that similar switch machines are used for operating the switches 14A and 14B, and the switch 16.

With reference to FIG. 5A a polar neutral relay 2WZ is provided for directly governing the operation of the track switches 2A and 2B, and it is understood that similar relays are provided for directly governing the operation of the single track switches 16 and the cross-over 14A and 14B. Each of these relays are energized by a respective WR or WN relay for operating the switch to either its normal or reverse position. In FIG. 5A a relay 2WR is illustrated for controlling the cross-over switch 2A and 2B to its reverse position and relay 2WN is provided for controlling the switch to its normal position. Similar relays WR and WN are provided for switches 14A and 14B and 16. Relays NCR and RCR are provided for each of the cross-over switches and for the single track switch for repeating the correspondence of the track switches with the position called for by the energization of the switch position selecting relays WR or WN. In FIG. 5A relays 2NCR and 2RCR are shown for detecting the correspondence position of the cross-over switch 2A and 2B. The relays NCR and RCR when energized close portions of the signal circuits to be sure that each of the signals are cleared only when a route has been completely set up extending between the respective signal location and the next signal location in advance.

Normally energized directional stick relays ES and WS are also provided for route locking purposes, an ES and WS relay being provided for each track section. Relays 1WF, 2WF, 1EF, and 2EF (FIG. 3B) are used for determining traffic conditions for both directions beyond the exit points of the system. A normally energized lock relay L is provided for each track switch, and such relay is dropped away in the usual manner whenever the electric locking provided for that track switch is effective. A normally energized lock stick relay LS is provided for each cross-over and the single track switch. A relay LS is dropped away after the track switch with which it is associated completes its operation in accordance with a switch control, and a controlling lock relay L is dropped away.

A GLP relay is provided for controlling the signals at the entrance to a track section. Referring to FIG. 5B a 1GLP relay, a 3GLP relay, a 5GLP relay, and a 9GLP relay, are illustrated, and it is understood that similar relays are provided for the remaining entrance and exit points in the track layout. Associated with each GLP relay is a GZ relay which when energized actuates a signal control network to give a proceed indication for its associated signal. For example, in FIG. 5B the energizing of the 3GZ relay causes signal 3 to clear through the signal control network and the energizing of the 1GZ relay similarly causes the signal 1 to clear. Also associated with each signal is a BLK relay which is provided to be energized normally independently of the system for preventing an associated signal or switch from clearing or being operated. In FIG. 5A and 5B relays 1BLK, 2BLK, 3BLK, 5BLK, and 9BLK are illustrated. A normally energized track relay T, is also provided for each section and is deenergized when a train occupies the track section controlling the track relay, and conventional track repeater relays TP are also used with this system.

An X relay is provided for each possible exit point of a designated route. As shown in FIG. 5B the operation of relay 3X, relay 5X, relay 1X, and relay 9X is caused to more directly determine the exit ends of the respective routes.

A conrtol machine as shown in FIG. 2 and fragmentarily shown in FIG. 3A is used in the entrance-exit system provided by the present invention. On this control machine is a panel within convenient reach of an operator and upon which is a miniature diagram corresponding to the track layout in the field for which the system is provided. The operating buttons on this panel are of the self-restoring type, that is they serve to close their associated contacts only when they are held pushed in or pulled out as the case may be. Disposed on the track diagram at points comparable to the signal locations at the track layout are a plurality of manually operable buttons 1PB, 3PB, 5PB, 7PB, 9PB, 13PB, 15PB, 17PB and 19PB which are pushed when the operator wishes to manually set up a route in the system. In this embodiment of the invention these buttons are connected in such a manner so that the first button which is actuated will designate the entrance end of a route and the next button which is actuated will designate the exit point of a route. It is noted that there is a correspondingly numbered group of buttons BLKPB associated with each correspondingly numbered button PB. The buttons BLKPB are actuated when it is desired to block their associated signals from being used.

A route set-up push button RSUPB is provided to be operated initially when the operator wishes to operate the entrance-exit system without storing route information in the system.

A code set-up push button CSUPB is provided to be operated initially when a designated route is to be stored in the system. A read-in, code cancel push button RI-CC is provided also, to be depressed for storing route information in the system and to be pulled out when a single selected route that is stored therein is to be cancelled.

Push buttons T1PB and T2PB are provided to be operated to designate the respective track T1 or T2 upon which the train is to enter in storing a route in the system. Push buttons TN5PB and TN6PB are operated for storing the identity of the particular train for which the stored route is applicable. Although only two buttons TN5PB and TN6PB are illustrated it is understood that similar buttons are provided on the control panel according to this invention for other identified trains. It is also to be understood that although only two buttons T1PB and T2PB are shown for storing information for trains entering on either track T1 or T2, similar buttons are provided for trains entering on other tracks of a system in actual practice.

A reset push button RS-PB is provided to be depressed when the operator wishes to cancel route information which is in the process of being set up. Buttons MC1PB and MC2PB have contacts which are connected in series and are operated simultaneously for cancelling all of the route information that is stored in the system. A lamp AE is illuminated when the operator is storing route information in the system and a lamp ME is illuminated when the operator is setting up a route in the system for immediately operating the switches and signals.

In order to simplify the description of the present invention various other push buttons which may be used in NX interlocking system, are not shown. Moreover, in order to simplify the description of the invention, the term "manual operation" will refer to the condition wherein an operator is immediately operating the switches and signals in response to the operation of the appropriate push buttons PB. The term "storing a route" will refer to the condition wherein an operator is pressing the appropriate buttons for indefinitely storing route information, which information will thereafter cause the route to be set up by the arrival of a particular train. The term "automatic operation" will refer to the operation of the switches and signals for a stored route as caused by the presence of a particular train.

Located on the control machine illustrated in FIGS. 2 and 6 is a memory unit generally referred to as M, in which the particular route information and train designation is stored indefinitely. This memory unit is removably attached to the control panel for inserting another similar memory unit. This is advantageous in that the operator can insert particular units M in the control panel, when desired, in accordance with the planned traffic program for a particular day. For example, there may be a memory unit for week day operation and a memory unit having route information stored therein for Sunday operation. The memory unit M is a ferrite core single layer matrix having magnetic cores 20 at the junction of 10 rows R and 4 columns CN. The ferrite cores 20 possess by virtue of their composition and processing a rectangular hysterisis loop. Because of this characteristic each core possesses the ability to remain indefinitely and reliably in either one of two magnetic states, namely a "one" state or a "zero" state. The "one" state will be regarded as the positive flux density state and the "zero" state will be defined as the negative flux density state. The theory of operation of ferrite cores is thoroughly explained in existing literature, therefore, a further explanation of their operation is unnecessary. Referring to FIG. 6 an enlarged view of a matrix M is illustrated. This matrix has a plurality of wires threaded through each the cores 20 in a conventional manner with certain of the wires being connected in the system for reading in or storing information and certain of the wires for reading out the information. A more detailed description of the matrix M will be given in connection with the description of the operation of the system.

Also located on the control machine are a plurality of multivibrators MV1, MV2, MV3 and MV4. These multivibrators MV are removably attached to the control machine so that they can be easily replaced for testing and repair. These multivibrators are provided for positively and reliably detecting the route data or information stored in the matrix M for actuating other apparatus in the system as will be described hereinafter. Referring to FIG. 7 a schematic diagram for a transistor digital multivibrator MV is illustrated. Each unit MV is comprised of an input transformer 22, gating diodes 24, an amplifier stage 26, and a flip-flop multivibrator stage 28. A plug 30 is provided to plug the unit MV into a receptacle such as 32 on the control panel. Although more than four multivibrators or readout units are illustrated in FIG. 2, only four are necessary in the illustrated embodiment of the invention, the other two multivibrators being spares. However, it is to be understood that more may be used in accordance with the needs of practice.

Alongside the tracks adjacent each entrance point of the system is an inductive wayside coil Y. As illustrated in FIG. 5A a wayside coil 1Y is provided to be influenced by a train approaching the signal A1, and an inductive coil 3Y is provided for a train approaching the signal A3. It is also to be noted that similar coils 15Y, 17Y and 19Y are located at the approach to the signals A15, A17 and A19 respectively. These wayside inductive coils Y transmit train identification information to the control office for identifying a train passing a particular wayside coil. The system for transmitting the identity of a train comprises the wayside coils Y to which is connected an electronic oscillator organized so that its output sweeps rapidly over a selected frequency range. The locomotive carries a control coil such as 36 which is tuned to a frequency within the sweep frequency range of the oscillator, so that each time the oscillator frequency sweeps through the resonant frequency of the tuned inductor, an energy transfer takes place from the pick up coil Y to the tuned control coil 36 on the locomotive. The wayside apparatus is so organized to detect the loading effect upon the oscillator, thereby ascertaining that an inductor, tuned to a frequency within the range of frequencies swept over by the oscillator, has passed the wayside location. The coils located on the locomotive are tuned to a particular preselected one of a plurality of resonant frequencies which are included within the range of frequencies swept over by the oscillator included in the wayside apparatus. A train identification system of the type used herein is described in U.S. Pat. No. 2,817,012 to which reference is made for a more detailed description thereof. In response to the passing of a train past a coil Y, a relay C is energized as described in the aforementioned patent. In the system of the present invention a relay C5 (FIG. 3B) is energized when train No. 5 passes a wayside coil Y and a relay C6 is energized when a train No. 6 passes a wayside coil. Only the relays C5 and C6 are shown in order to simplify the description, but it is understood that for each designated train that is to pass through the NX interlocking system in actual practice there is provided an appropriate C relay.

Referring to FIGS. 3A through 3Q, the various apparatus is shown in a circuit arrangement according to one embodiment of this invention. A slow drop away relay RSUPBP is provided to be energized in response to the pressing of the button RSUPB on the control panel. A repeater relay RSUPBPP is provided to be energized in response to the picking up of the RSUPBP relay when the operator desires a manual operation of the system. A relay CSUPBP is provided to be energized in response to the operation of the button CSUPB when the operator wishes to condition the system for storing route information therein.

Figure 3B:
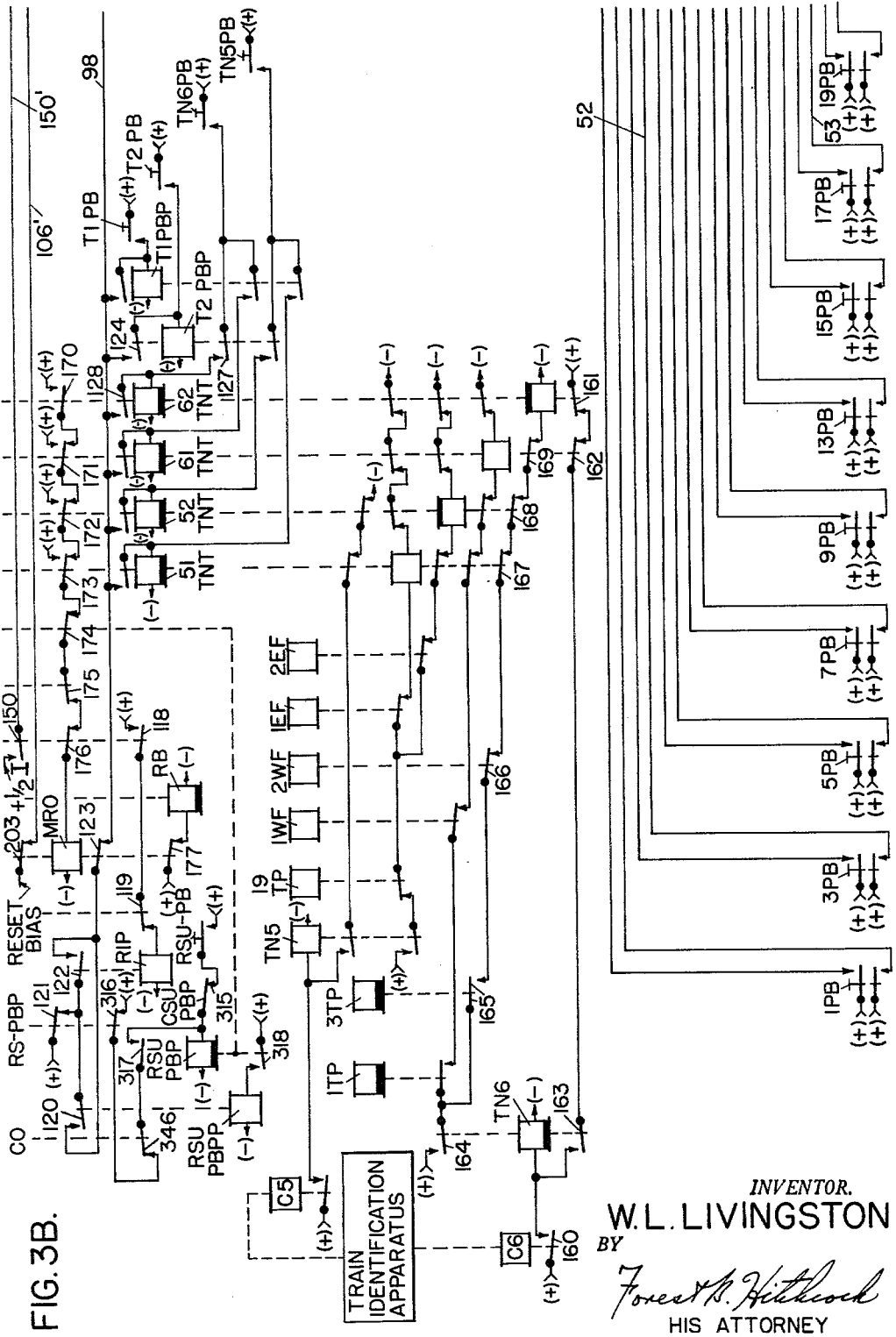

A read-in relay RI is energized in response to the pressing of the button RI–CC for energizing its repeater relay RIP when the operator wishes to store information in the system. Relays TNT are selectively energized in response to the operation of the push buttons TPB through a relay TPBP and the operation of a push button TNPB for causing information regarding the particular track and train identity to be stored in the system. As shown in FIG. 3B, 51TNT is energized when train No. 5 is designated as entering on track T1 for storing this information in the system and 62TNT is energized for information regarding the route for train No. 6 entering on track T2. The relays TNT are also provided to cause route information stored in the system to set up an automatically preselected route when a train approaches the system.

Relays PBP (FIG. 3D) are energized in response to the pressing of the appropriate numbered push buttons PB on the track diagram for manually setting up a route in the system or for storing the route information in the system. The sequence of operation of the relays PBP in response to the pressing of their associated buttons PB determines the entrance and exit ends of the route. The relays EN and EX are provided to be both energized when two relays PBP are energized for a train travelling in an easterly direction, and relays WN and WX are provided to be energized after two relays PBP are energized in a route for a train travelling in a westerly direction. Contacts on the PBP relays and the EN and EX or WN and WX relays serve to energize an appropriate column CN in the matrix M with a current having a value of $+\frac{1}{2}$ I, and the previously mentioned relays TNT cause the selective energization of an appropriate R row in the matrix with current having a value of $+\frac{1}{2}$ I. As is well-known in the operation of ferrite matrices it is necessary to have two pulses of $+\frac{1}{2}$ I current occurring simultaneously to place a particular core in a "one" state. Therefore through the operation of the TNT relays, and the PBP and EN, EX, WN, WX relays, at least one particular core 20 will be placed in a "one" state for storing the train identity and route information.

A relay MRO is provided to cause the information in particular cores 20 to read-out when an identified train enters the area controlled by the system. A relay RB is provided for causing the information that is read-out to be again stored or read back into the matrix M.

A relay CO is provided to return the system to normal after the entrance and exit ends of the route have been manually determined for either storing a route or for manual operation.

Relays CC, MC and RS–PBP are provided for cancelling out in response to the operation of their respective buttons under various conditions. For example, relay MC when energized cancels all information stored in the matrix M; relay CC when energized cancels only designated routes stored in the system; and relay RS–PBP cancels manually operated routes. It should also be noted in this connection that the relays PBP have a knock down winding which is energized when its correspondingly numbered button PB is pulled so that particular entrance and exit points can be cancelled in the event of error.

Figure 3G:
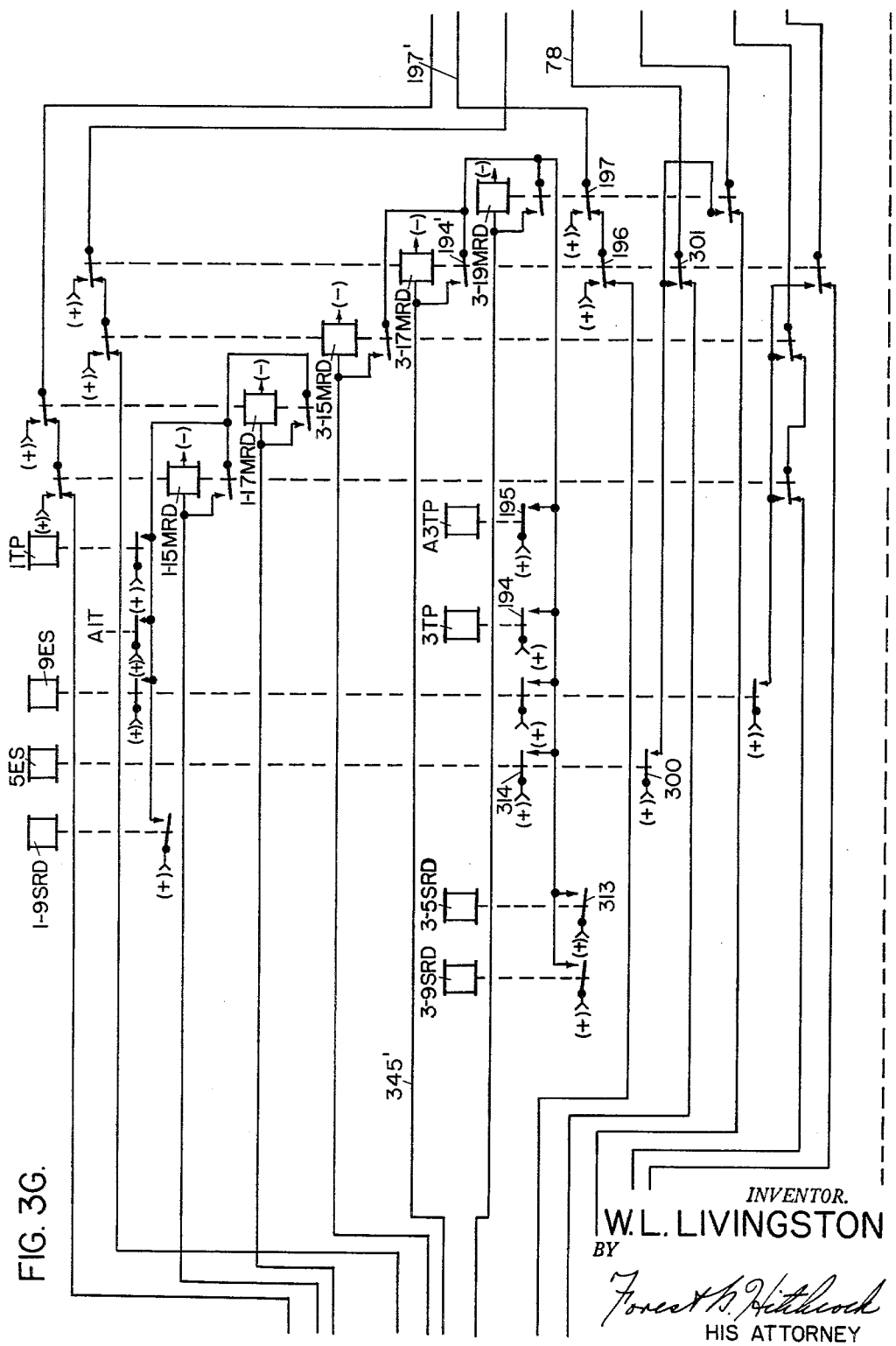
Figure 3J:
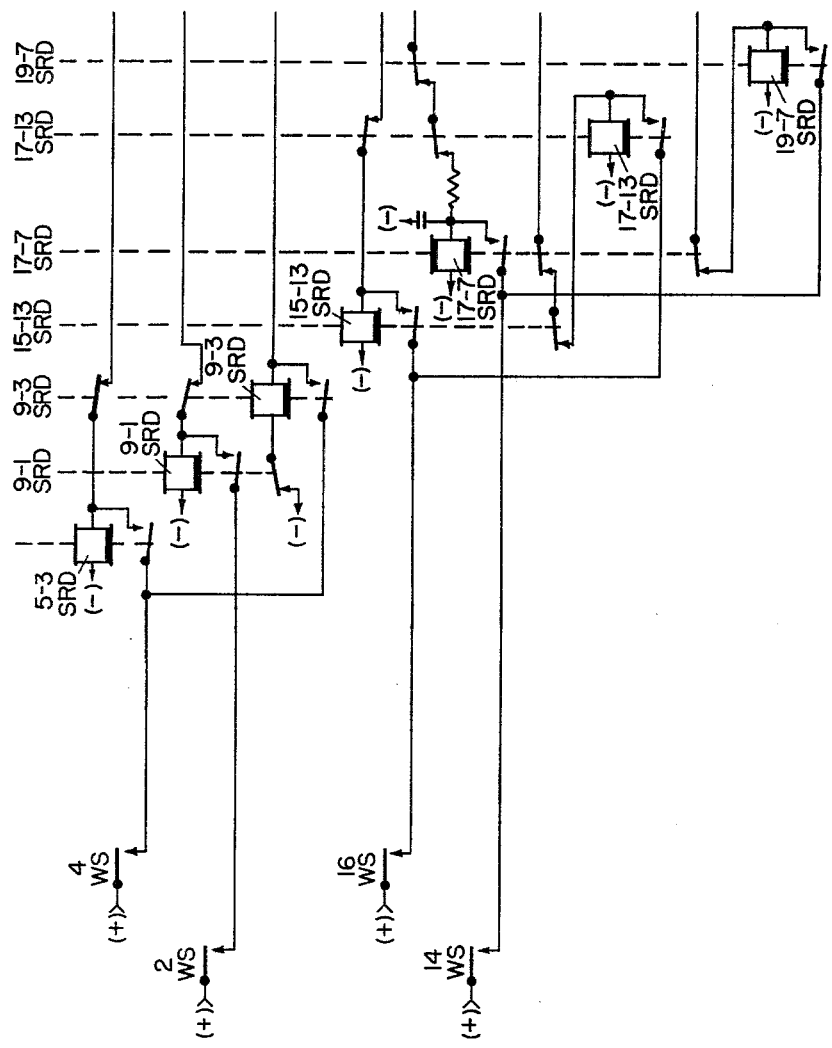
Figure 3K:
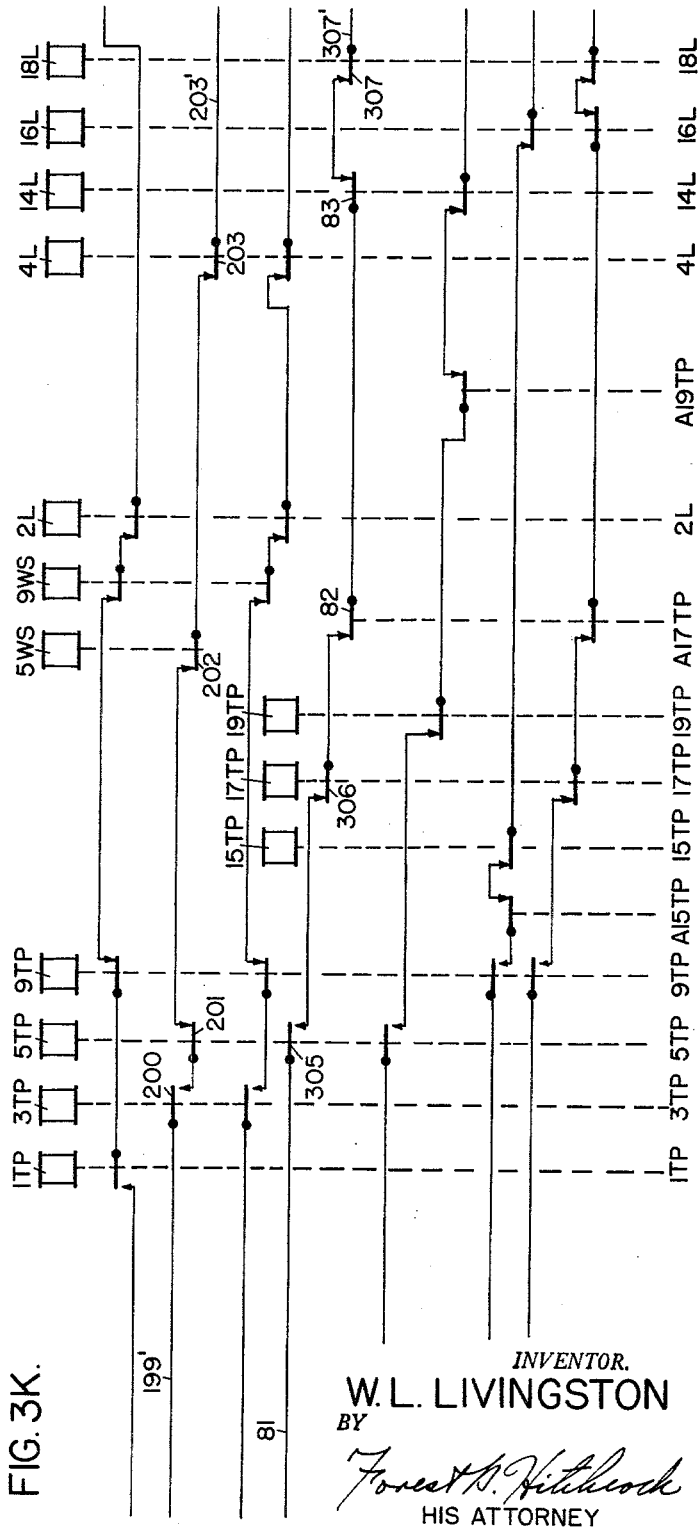
Figure 3L:
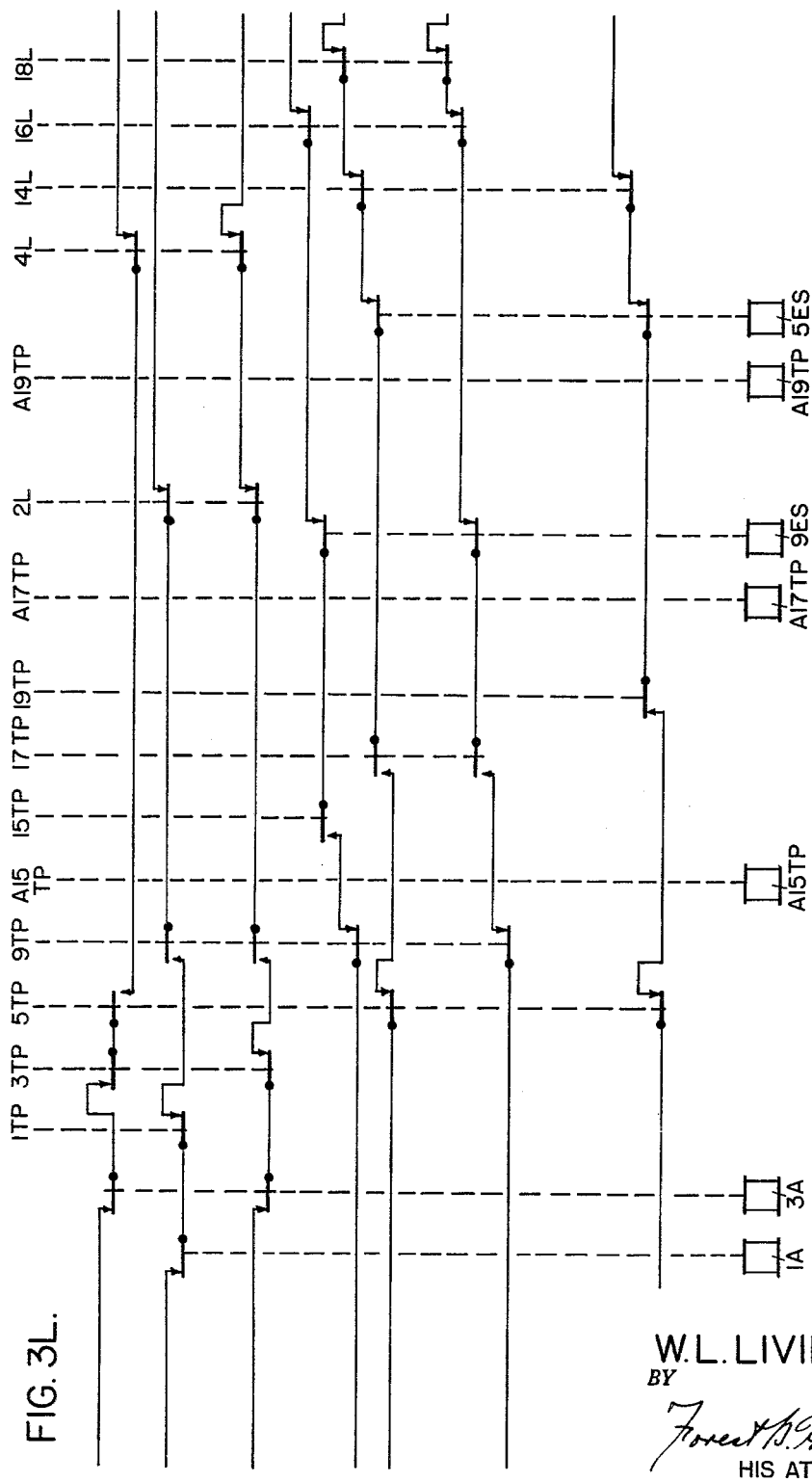
Figure 3N:
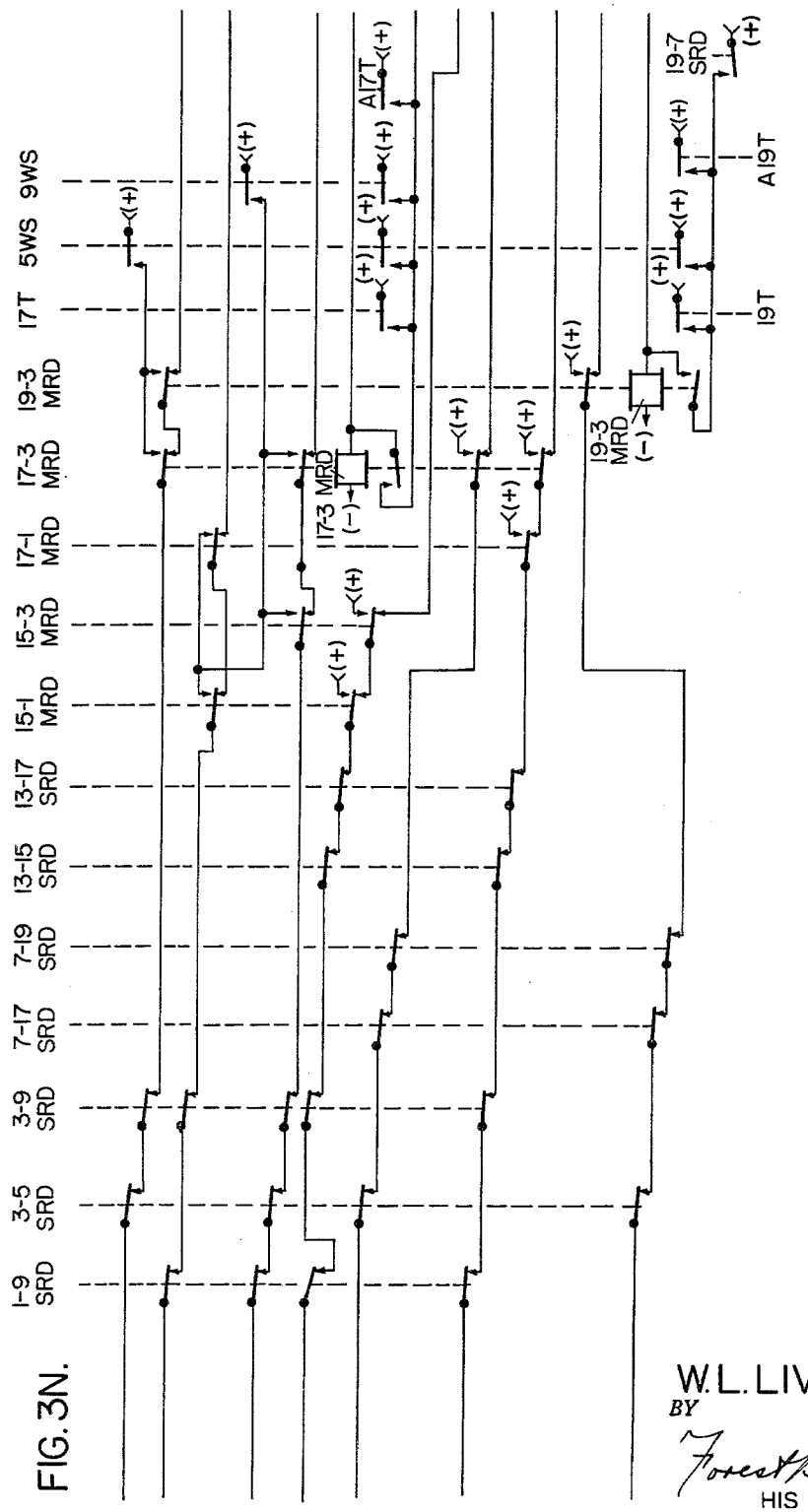

A master route determining relay MRD is provided for each master route that is possible according to a certain track layout. In the illustrated embodiment of the invention, a 1–15 MRD relay, for example, is energized for designating a route from the entrance point which is signal 1 to the exit point which is signal 15; and a relay 15–1MRD is provided for a route having an entrance point at signal 15 and an exit point at signal 1. As shown in FIG. 3G, relays 1–15MRD, 1–17MRD, 3–15MRD, 3–17MRD and 3–19MRD are provided for corresponding entrance and exit points in the track layout for one direction of travel in accordance with the prefixed numerals on the relay; and in FIGS. 3M and 3N are the master route determining relays for the opposite direction of travel, namely 15–1MRD, 15–3MRD, 17–1MRD, 17–3MRD and 19–3MRD.

Relays 1CD, 2CD, 3CD, 4CD, 5CD and 6CD, one or more of which are energized simultaneously during manual operation of the system are provided for selecting one of the master route determining relays MRD. Read-out relays 1RO, 2RO, 3RO and 4RO, together with their correspondingly numbered read-out repeater relays ROP are energized simultaneously in certain combinations for energizing a particular master route determining relay MRD under conditions of automatic operation.

A plurality of sectional route determining relays SRD are provided to be energized when either the operator desires a route to be set up manually between the entrance and exit points of the system, such as from the entrance point at signal 3 to the exit point at signal 5, for example; or the relays SRD are energized as controlled by appropriate relays MRD so that each section of a route is set up in the field in sequence. As will be seen in FIG. 3J and 3M a sectional route determining relay is provided for each section or, in other words, between each pair of signals. There is a sectional route determining relay for each direction of travel of a train. As seen in FIG. 3J, for example, there is a 9–1SRD relay for a train travelling in a westerly direction on track section 2T and in FIG. 3M a 1–9SRD relay for a sectional route over track section 2T in an easterly direction.

A plurality of relays NC, namely NC1, NC2, NC3 and NC4 one or more of which is provided to be energized in response to the operation of a particular sectional route determining relay SRD, operates a particular GLP relay as previously mentioned for initiating the sending of the proper signal control to the field. Relays XC, namely, XC1, XC2, XC3 and XC4 are provided to be energized into a certain combination simultaneously for operating a particular X relay to complete and interlock the desired route. Relays N and XF, are operated by one or more NC relays to insure that a proper GLP relay will be energized before the X relay in a sectional route. A relay XA is operated by one or more XC relays to restore the N, NC, XC and XF relays to normal, and is made slow drop away to insure that the information has been properly received by way of GLP and X relays.

Referring to the general overall organization of the system according to the illustrated embodiment of the invention with reference to the block diagram of FIG. 1, the storing of a route, and the manual operation of the system is effected by operating suitable push buttons on a control panel, and the automatic operation of the system is initiated by the presence of a train approaching the system.

In the manual operation of the system, the entrance and exit selection circuitry is conditioned by the manual operation circuitry to immediately effect the master route determining circuitry for operating the sectional route determining circuitry which in turn controls the switch and signals in the field.

In storing a route in the system the operation of the route storing circuitry in combination with the entrance and exit selection circuitry, and the train and track designation circuitry causes a particular route for a particular identified train to be stored in the memory device. In the illustrated embodiment of the invention, the track and train designating circuitry in combination with the route storing circuitry is effective to apply a +½ I current to the memory device and the entrance and exit selection circuitry as governed by the route storing circuitry is effective to cause another +½ I current to be applied simultaneously with the first half-current to the memory device to store a particular route therein.

In the automatic operation of the system a train 35, such as shown in FIG. 1, carrying a control coil 36 passes a wayside inductor Y which first operates the train identifying system to pick up a particular relay C. Then, the dropping away of a repeater relay TP operates the track and train designation circuitry to cause a memory selection read-out circuitry to apply a −I current to the memory device. This application of the −I current causes the memory device to activate the memory responsive readout circuitry for operating appropriate master route determining portions of the system. The memory selection read-out circuitry when appropriately affected, and the memory responsive read-out circuitry when appropriately affected will cause two +½ I currents to be introduced into the proper position in the memory device to again store the identical route in the system.

*Manual operation*

Assuming that a train is approaching the interlocking system on track section 3T and it is desired to set up a particular route for that train manually, because of the absence of identifying apparatus or a sudden change in schedules, or for any other reason, the operator presses the button RSUPB on the control panel. Assuming that the entrance point of the train is the No. 3 signal and the exit point of the train is to be No. 17 signal, the button 3PB is first pressed and subsequent thereto the button 17PB is pressed. In response to the pressing of the button RSUPB the relay RSUPBP is energized by a circuit which extends from (+) and includes back contact 315 of the relay CSUPBP and the winding of relay RSUPBP to (−). The picking up of the relay RSUPBP energizes its repeater relay RSUPBPP by an obvious circuit. The picking up of the relay RSUBPB causes its back contact 100 to open which prevents the storing of route information in the system. Its contact 174 also opens which prevents the relay MRO from being picked up thus preventing the reading out of information in the cores while a route is being manually set up. This lock-out is effective just while a route is being manually designated, however, for a time interval determined by the drop away time of the slow drop away relay RSUPBP. Also, front contact 120 of relay RSUPBPP closes which applies positive energy to the stick circuit for the PBP relays and the EN and EX relays. The relay RSUPBP is stuck up by a circuit which extends from (+) and includes back contact 316 of relay RS–PBP, back contact 346 of the clear-out relay CO, front contact 317 of relay RSUPBP, and the winding of relay RSUPBP to (−).

It should also be noted that contacts 326, 329, 329', 334, 334' and 338 of the relay RSUPBP close to partially complete the pick up circuit for the relays 1CD, 2CD, 3CD, 4CD, 5CD and 6CD respectively.

When the operator presses the button 3PB, the relay 3PBP is energized by a circuit which extends from (+) and includes a contact on button 3PB, wire 52, and the upper winding of relay 3PBP to (−). In response to the picking up of the relay 3PBP the relay EN is energized by a circuit which extends from (+) and includes front contact 131 of relay 3PBP, back contact 132 of relay 7PBP, back contact 133 of relay 13PBP, back contact 134 of the relay CO, back contact 135 of the relay WN, back contact 136 of the relay EX, and the winding of relay EN to (−). The relays 3PBP and EN are held picked up by a stick circuit which extends from (+) and includes back contact 121 of relay RS–PBP, front contact 120 of relay RSUPBPP, back contact 123 of relay MRO, wire 98, front contact 130, and the upper winding of relay 3PBP to (−) and the front contact 137, and the and the winding of relay EN to (−), respectively. It should be noted that the picking up of the relay EN opens its back contact 142 to prevent the WN relay from being picked up at the same time. Also, front contacts 324, 327, 327', 332, 332' and 336 of the relay EN are closed in the pick up circuits for the CD relays.

When the operator presses the button 17PB, the relay 17PBP is picked up by a circuit which extends from (+), and includes a contact of the button 17PB, wire 53, and the upper winding of relay 17PBP to (−). The relay 17PBP is immediately stuck up through its front contact 138 by means of the previously mentioned stick circuit or relay 3PBP and EN. In response to the picking up of the relay 17PBP, the relay EX is energized by a circuit which extends from (+) and includes front contact 139 of relay 17PBP, back contact 140 of relay 19PBP, back contact 141 of relay CO, front contact 142 of relay EN, and the winding of relay EX to (−). The relay EX is held energized by the last mentioned stick circuit through its front contact 143. In response to the picking up of relay 17PBP its front contacts 330 and 335 close, and in response to the picking up of relay EX its contacts 325, 328, 328', 333, 337 and 337' close in the pick up circuits for the CD relays. Thus at this point, a circuit is complete for energizing the relay 1CD which extends from (+) and includes front contact 320 of relay 3PBP, back contact 322 of relay 7PBP, back contact 323 of relay 13PBP, front contact 324 of relay EN, front contact 325 of relay EX, front contact 326 of relay RSUPBP and the winding of relay 1CD to (−). Simultaneously the relay 2CD is picked up by a circuit which extends from (+) and includes front contact 321 of relay 3PBP, front contact 327 of relay EN, front contact 328 of relay EX, front contact 329 of relay RSUPBP, and the winding of relay 2CD to (−). Also simultaneously with the picking up of the relay EX the relay 4CD is energized by a circuit which extends from (+) and includes front contact 330 of relay 17PBP, back contact 331 of relay 19PBP, front contact 332 of relay EN, front contact 333 of relay EX, front contact 334 of relay RSUPBP, and the winding of relay 4CD to (−). Also, simultaneously the relay 6CD is energized by a circular which extends from (+) and includes front contact 335 of relay 17PBP, front contact 336 of relay EN, front contact 337' of relay EX, front contact 338 of relay RSUPBP and the winding of 6CD to (−). Thus, it is apparent at this point that the picking up of the relays 3PBP and 17PBP in that sequence causes the EN and EX relays to be energized which cause, in response to the picking up of the relay EX, a certain combination of the CD relays to be picked up simultaneously. In this instance, where we are assuming that the train is travelling from signal 3 to 17 in an easterly direction, the relays 1CD, 2CD, 4CD and 6CD are picked up, as is apparent for other routes, other combinations of the relays CD are picked up.

Also, in response to the picking up of the EX relay the clear-out relay CO is energized by a circuit which extends from (+) and includes front contact 145 of relay EX (FIG. 3D), front contact 146 of relay EN, and the winding of relay CO to (−). The slow picking up of the relay CO causes its back contact 346 (FIG. 3B), in the stick circuit of RSUPBP to open, thus dropping away the relay RSUPBP and its repeater RSUPBPP. The relay RSUPBP is slow drop away to insure that the information caused by the selective energization of the relays CD as heretofore described is properly transferred as hereinafter described. The dropping away of the relay RSUPBPP causes the relays 3PB, 17PB, EN and EX to drop away by opening their stick circuits at front contact 120. At this point, the operator may again operate the system manually or, if he wishes store route information in the system in a manner hereinafter described. At any time during the manual operation of the system an identified train can automatically set up its own route as stored in the system as long as it does not conflict with the route having an entrance point at signal 3 and an exit point at signal 17.

In response to the picking up of the aforementioned CD relays by the relay EX, the master route determining relay 3–17MRD is energized by a circuit which extends from (+) and includes front contact 340 of relay 1CD (FIG. 3E), front contact 341 of relay 2CD, back contact 342 of relay 3CD, front contact 343 of relay 4CD, back contact 344 of relay 5CD, front contact 345 of relay 6CD, wire 345′ and the winding of relay 3–17MRD (FIG. 3G) to (−). The relay 3–17MRD is held picked up by a stick circuit which extends from (+) and includes back contact 194 of relay 3TP or back contact 195 of relay A3TP which are dropped away when a train is occupying a track section 3T, or track section A3T respectively, front contact 194′ of relay 3–17MRD and the winding of the relay to (−). The picking up of the relay 3–17MRD energizes the sectional route determining relay 3–5SRD. At this point it is to be noted that the sectional route determining relay 3–9SRD, (FIG. 3M), which could also be included in a route from signal 3 to signal 17 over the switch 2A and 2B, has a resistor and capacitor in its pick up winding so that it will be delayed in picking up with respect to the relay 3–5SRD. This feature gives a train travelling from signal 3 to 17 a preferred route over switch 14A and 14B in its reversed position and switch 2A and 2B in its normal position, but if there is a conflicting route with this preferred route, the train will travel from track section 3T to track section 9T over switch 2A and 2B in this section of the route. The relay 3–5SRD is picked up by a circuit which extends from (+) and includes front contact 196 of relay 3–17MRD (FIG. 3G), back contact 197 of relay 3–19MRD, wire 197′ back contact 198 of relay 5–3SRD, (FIG. 3H), back contact 199 of relay 9–3SRD, back contact 206 of relay 17–7SRD, back contact 207 of relay 19–7SRD, wire 199′, back contact 200 of relay 3TP (FIG. 3K), front contact 201 of relay 5TP, front contact 202 of relay 5WS, front contact 203 of relay 4L, wire 203′, the winding of relay 3–5SRD (FIG. 3M), and back contact 204 of relay 3–8SRD to (−). It should be noted that back contacts 198, 199, 206 and 207, front contact 201, front contact 202 and front contact 203 are included in this pick up circuit to insure that there are no conflicting route set up in the system and no unsafe traffic conditions existing in the field.

In response to the picking up of the 3–5SRD relay (see FIG. 5A) the switch 2A and 2B is operated to its normal position if not already in that position by a circuit which extends from (+) and includes front contact 220 of relay 3–5SRD, back contact 221 of the relay 2BLK, back contact 222 of the reverse control relay 2WR and the winding of relay 2WN to (−). As is evident in FIG. 5A, the energizing of the relay 2WN causes the polar neutral relay 2WZ to be energized in one direction through front contact 224 of relay 2WN for controlling the switch to its normal position.

Simultaneously, front contacts 213, 216, 217, 254, 255 and 256 of relay 3–5SRD close. Each of the SRD relays has similar contacts which are arranged to simultaneously pick up a different combination of the NC relays and the XC relays. The closing of contacts 213, 216 and 217 of the relay 3–5SRD simultaneously energizes relays NC1, NC2 and NC3. The circuit for energizing these relays extends from (+) and includes back contact 210 of relay 5X, front contact 212 of relay 4ES, contacts 213 and 216 and 217, wires 213′, 216′ and 217′, back contacts 214 and 218 and 219 of the relay XF, back contacts 215 and 215′ and 215″ of relay XA, and the respective windings of the relays NC1, NC2 and NC3 to (−). It is evident at this point that the circuits for picking up the XC relays is still open because of the dropped away position of relays XF and N. The picking up of the relays NC1 and NC2 and NC3, energizes the relay N by a circuit which extends from (+) and includes either contact 225, 226 and 227 of the relays NC, back contact 228 of relay XA, and the winding of relay N to (−). Upon the picking up of the relay N with the relays NC picked up, the relay 3GLP is energized by a circuit which extends from (+) and includes back contact 232 of relay XF, front contact 231 of relay N, front contact 233 of relay NC1, front contact 234 of relay NC2, front contact 235 of relay NC3, back contact 236 of relay NC4, wire 236′, back contact 237 of relay XZ, back contact 238 of relay 3X, back contact 239 of relay 3BLK, back contact 240 of relay 4TK, and the winding of 3GLP to (−). It will be noted in FIG. 3P that the relay N closes the pick up circuit for the relay XF but that the back contact 232 of relay XF is included in the energizing circuit for the 3GLP relay. Because the relay XF is a slow pick up relay the relay 3GLP is energized during the time interval that the relay N is picked up and the relay XF is still dropped away.

When the relay XF picks up, the energizing circuit for the XC relays is completed. The contacts 254, 255, and 256 of the relay 3–5SRD simultaneously energize relays XC1, XC2, and XC4 the combination of which causes the picking up of the relay 5X (see FIG. 5B) when the relay XA is energized (see FIG. 3Q). The picking up of the relay XA is also caused by the closing of an XC relay by one of its front contacts 262, 261, or 260. It should also be noted that front contact 263 of relay XF and front contact 264 of relay N are also included in the pick up circuit for relay XA. The circuit for picking up the relay 5X in response to the picking up of relay XA and the dropping away of relay XF which occurs when relay XA picks up because of the opening of its back contact 228, extends from (+) and includes front contact 270 of relay XA, front contact 271 of relay XC1, front contact 272 of relay XC2, back contact 273 of relay XC3, front contact 274 of relay XC4, wire 274′, front contact 275 of relay 5XZ, and the lower winding of relay 5X to (−).

The relay 5XZ was energized in response to the picking up of relay 3GLP by a circuit which extends from (+) and includes front contact 246 of relay 3GLP, back contact 247 of relay 2WR (it will be recalled that switch No. 2 is controlled to its normal position), the winding of 5XZ and back contact 248 of the conflicting entrance relay 5GLP to (−). The relay 5X is stuck up through front contact 276 of relay 5XZ and its own front contact 277.

Thus, it is seen that upon the picking up of the sectional route determining relay 3–5SRD, the switch 2A is operated to its normal position if not already in that position, and the signal 3 has been cleared for the operation of a train over the sectional route.

It should be noted that the picking up of both relays 3GLP and relays 5X caused their front contacts 210 (FIG. 3P) and 211 (FIG. 3M) to open thus insuring the removal of any energy to the energizing circuits for this combination of NC and XC relays.

When the train arrives in track section 5T the sectional route determining relay 7–17SRD is energized by a circuit which extends from (+) and includes back contact 300 of the directional relay 5ES (FIG. 3G), front contact 301 of relay 3–17MRD, wire 78, back contact 302 of relay 17–17SRD, (FIG. 3H), back contact 303 of relay 17–13SRD, back contact 304 of relay 19–7SRD, wire 81, back contact 305 of the track repeater relay 5TP (FIG. 3K), front contact 306 of the track repeater relay 17TP, front contact 82 of relay A17TP, front contact 83 of relay 14L, front contact 307 of relay 18L, wire 307′, back contact 308 of relay 13–17SRD (FIG. 3M) and the winding of relay 7–17SRD to (−). This relay is held in its picked up condition by a stick circuit which extends from (+) and includes front contact 206 of relay 18ES, front contact 309 of relay 7–17SRD and the winding of the relay to (−). It is also noted that the relay 3–5SRD is still held in its picked up condition through front contact 208 of relay 4ES and its own front contact 205.

The picking up of the relay 7–17SRD causes another combination of NC and XC relays to be energized, with the NC relays being energized prior to the XC in the following manner. The circuit for energizing the relays NC1 and NC2 which is the particular combination for this sectional route determining relay 7–17SRD extends from (+) and includes either back contact 401 of relay 17X (FIG. 3P), or back contact 402 of relay 7GLP (FIG. 3M), front contact 403 of relay 18ES, front contact 404 and 405 of relay 7–17SRD, wires 213' and 216', back contacts 214 and 218 of relay XF (FIG. 3P), back contacts 215 and 215' of relay XA, and the windings of relay NC1 and NC2 to (−). Upon the picking up of relays NC1 and NC2 the relay N is energized by the previously mentioned similar circuit and during the time that the relay N is picked up and the relay XF is still dropped away, a relay 7GLP (not shown), and arranged in a circuit similar to the 3GLP relay is energized by a circuit which extends from (+) and includes back contact 232 of relay XF (FIG. 3Q), front contact 231 of relay N, front contact 233 of relay NC1, front contact 234 of relay NC2, back contact 235 of relay NC3, back contact 407 of relay NC4, and wire 407', to a relay 7GLP. In a manner similar to the previously described operation of the XF and N relays, the relay XA is energized which causes a relay 17X (not shown) associated with the signal 17 to be picked up. The combination of relays XC for picking up the relay 17X includes front contacts 409, 410 and 411 of relay 7–17SRD (FIG. 3M) causes the picking up of relays XC4, XC3 and XC2 (FIG. 3P). The picking up of these relays results in a flow of energy over wire 412 as is evident from FIG. 3Q which is assumed to be connected to a relay 17X that is connected in a manner similar to the relay 5X. It should also be noted that this system is arranged so that the picking up of the relay 7–17SRD operates the switch 14A and 14B to a reverse position by a circuit similar to the operation of the switch 2A and 2B as caused by the relay 3–5SRD.

When the relays 4ES and 18ES drop away they break the stick circuit for the relays SRD that are picked up and if the traffic conditions in the system are such that the pick up circuit for the particular SRD relay is broken the associated relay SRD will stay dropped away. Also, when the sectional route determining relay 3–5SRD that was first picked up in our operating example drops away, traffic conditions permitting, the stick energy for the relay 3–17MRD is removed by the opening of contact 314 of relay 5ES. The removal of energy from the pick up circuit for the relay 7–17SRD by the opening of front contact 301 of 3–17MRD, thus permitting the sectional route determining relay 7–17 to drop away when the train has progressed through the route.

Thus, a typical operating condition has been described for manually operating the system for a train approaching the area governed by the entrance-exit system of the present invention. The operation of the system will now be described with reference to the storing of route information indefinitely therein.

*Manually storing a route in the system*

Assuming that the operator wishes to store a route in the system for a train No. 6, and which route extends from the entrance point at signal 3 to the exit point at signal 17, the button CSUPB is pressed which prevents the operator from manually setting up a route during this time. He then presses button RI–CCPB, button T2PB, because the entrance to signal 3 is on track T2, and button TN6PB which is the proper button for storing a route for train No. 6. The operator then presses button 3PB after which he presses button 17PB thus determining the entrance and exit points for the route.

In response to the pressing of the button CSUPB, the slow drop away relay CSUPBP will pick up by a circuit which extends from (+) and includes a contact of the button CSUPB (FIG. 3A), back contact 100 of the relay RSUPBP and the winding of the relay to (−). This relay is then held in its picked up position by a stick circuit which extends from (+) and includes back contact 105 of relay CO, back contact 103 of relay RS–PBP, front contact 102 and the winding of relay CSUPBP to (−). The picking up of relay CSUPBP causes its back contact 175 to open in the pick up circuit for the master read-out relay MRO to prevent a route description from being read out of the memory device. Also, others of its front contacts close, one of which is front contact 154 (FIG. 3D) to partially complete the circuit for energizing the columns of the matrix M. Also, its front contact 113 closes to partially complete the pick up circuit for relay RI.

In response to the pressing of the button RI–CC, the slow drop away relay RI is picked up by a circuit which extends from (+) and includes contact 112 of the push button, front contact 113 of the relay CSUPBP and the winding of relay RI to (−). This relay is held picked up by a stick circuit which extends from (+) and includes back contact 116 of relay CO, front contact 117 of relay RI and the winding of relay RI, to (−). The picking up of the RI relay partially completes the energizing circuit for the matrix rows R0 through F9 by the closure of its front contact 155. The relay RI also partially completes the energizing circuit for the columns of the matrix M by the closure of its front contact 150. It also opens its front contact 176 in the pick-up circuit for the relay MRO. In response to the picking up of the relay RI, the relay RIP is energized by a circuit which extends from (+) and includes front contact 118 of relay RI, back contact 119 of relay CC and the winding of relay RIP, to (−). The picking up of the relay RIP closes its front contact 122 to provide stick energy for the relays TPBP, TNT, and PBP when picked up as hereinafter described.

It should be noted at this point that the system is conditioned for reading a train identification and route description into the matrix M and to prevent the manual operation of the system and also to prevent the reading out of a stored route description.

In response to the pressing of button T2PB relay T2PBP is picked up by an obvious circuit. This relay is held picked up by a stick circuit which extends from (+) and includes back contact 121 of relay RS–PBP, front contact 122 of relay RIP, back contact 123 of relay MRO, front contact 124 of relay T2PBP and the winding of the relay to (−). The picking up of the relay T2PBP partially completes the pick up circuit for both the relays 52TNT and 62TNT thereby conditioning the system for designating either train No. 5 or train No. 6 to enter the system on track 2. Since train No. 6 is the one for which this example of operation is given, the relay 62TNT is picked up in response to the pressing of the button TN6PB by an obvious circuit which includes front contact 127 of relay T2PB. The relay 62TNT is held picked up through the same stick circuit that is holding up the relay T2PBP.

In response to the picking up of the relay 62TNT a $+\frac{1}{2}$ I current is introduced into row R9 of the memory matrix M by a circuit which includes front contact 155 of the relay RI, front contact 156 of relay 62TNT and the wire designated R9' for the row R9 of the matrix. This energizes each of the cores in row R9 with a $+\frac{1}{2}$ I current. However because two $+\frac{1}{2}$ I pulses of current are necessary to change a core 20 from the "zero" to the "one" state, as is well-known in the art, none of the cores in row R9 of the matrix M are at this point in their "one" state.

In response to the pressing of the button 3PB, the relay 3PBP is energized by the pick up circuit described in connection with the manual operation of the system. This relay is held picked up by the same stick circuit that is holding relays 62TNT and T2PBP over wire 93. In response to the picking up of the relay 3PBP, the relay EN is energized by the same circuit described in connection with the manual operation of the system. The picking up of the relay EN closes its front contacts, one of which is 152 (FIG. 3D) to complete partially the energizing circuits for the columns CN of the matrix M.

In response to the subsequent pressing of the button 17PB, the relay 17PBP is energized by the same circuit described in connection with the manual operation of the system, and is held picked up by the same stick circuit that is holding up relay 3PBP. In response to the picking up of relay 17PBP, the relay EX is energized by the identical circuit described in connection with the manual operation of the system. The picking up of the relay EX causes its front contacts, one of which is referred to at 153, to complete the circuit for energizing column CN1 of the matrix with a +½ I current. This circuit extends from the +½ I source (FIG. 3B) and includes front contact 150 of the relay RI, wire 150', front contact 151 of relay 17PBP, front contact 152 of the relay EN, front contact 153 of the relay EX, front contact 154 of the relay CSUPBP, and the wire leading to column CN1 of the matrix M.

Since the row R9 of the matrix M was energized with +½ I current and column CN1 of the matrix M is now energized with a +½ I current the core referred to at 20A is now changed from its "zero" to its "one" state, because it is the only core which has received the two pulses of +½ I current. Therefore core 20A being in its "one" state stays in this state indefinitely until changed, as will be hereinafter described, to store the information that train No. 6 upon arrival at track 2 is to follow a route, the entrance point of which is signal 3 and the exit point of which is signal 17.

When the relay EX picked up, it completed the energizing circuit for the relay CO, which circuit was described in connection with the manual operation. In response to the picking up of the relay CO, the relay CSUPBP is dropped away by the opening of back contact 105 and the slow drop away read-in relay in caused to drop out by the opening of back contact 116 of the relay CO. The dropping away of relay RI also drops out its repeater relay RIP.

When the relay RIP drops away, the stick circuit for the relays 62TNT, T2PBP, 3PBP, 17PBP, EN, and EX is broken and they return to their normally deenergized positions.

At this point the system is again in its normal condition so that another route may be stored in the system, or the system may be operated manually as heretofore described.

It should be noted in connection with storing another route that in the event that the operator is not sure on which track that train No. 6 will enter the system, he may set up another route which will give the train the same exit point, namely signal 17 by pressing the buttons TN6PB and T1PB following by the operation of the buttons 1PB and 17PB in sequence.

*Automatic operation*

Assuming that train No. 6 is approaching track No. 2 in an easterly direction, its control inductor passes the wayside inductor 3Y (FIG. 5A) which causes the picking up of relay C6 (FIG. 3B). The manner in which this is accomplished can be readily understood by reference to the U.S. Pat. No. 2,817,012 hereinbefore mentioned. In response to the picking up of relay C6, the relay TN6 is energized by an obvious circuit which includes front contact 160 of relay C6. The relay TN6 is held picked up by a stick circuit when extends from (+) and includes back contact 161 of relay 62TNT, back contact 162 of relay 61TNT, front contact 163 of relay TN6 and the winding of relay TN6 to (−). The back contact 162 is included in the circuit to insure that a similarly identified train is not entering the system over track T1.

When the train No. 6 arrives on track section 3T, the track repeater relay 3TP drops away which causes the picking up of relay 62TNT by a circuit which extends from (+) and includes front contact 164 of relay TN6, back contact 165 of relay 3TP, back contact 166 of relay 2WF, back contact 167 of relay 51TNT, back contact 168 of relay 52TNT, back contact 169 of relay 61TNT, and the lower winding of relay 62TNT to (−). The picking up of relay 62TNT energizes the master read-out relay MRO by a circuit which extends from (+) and includes front contact 170 of relay 62TNT, the back contacts 171, 172, and 173 of the other TNT relays, back contact 174 of the relay RSUPBP, back contact 175 of the relay CSUPBP, back contact 176 of the relay RI, and the winding of the relay MRO to (−).

The picking up of the relay MRO also applies a −I current to the matrix M over R9 row by a circuit which extends from the value −I and includes front contact 178 of relay MRO, front contact 179 of relay RB, back contact 155 of relay RI, front contact 156 of relay 62TNT, and the wire leading to row R9 of the matrix M.

Inasmuch as the core 20A is the only core in the row R9 which is in a "one" state, the application of the −I current will cause this core to switch to a "zero" state, as is well known in the art, and thus supply an output voltage to the multivibrator MV2 by way of wire 40. The operation of the multivibrator MV2 as caused by the output from the core 20A, energizes the read-out relay 2RO as illustrated in FIG. 3F. The picking up of the relay 2RO energizes its repeater relay 2ROP by an obvious circuit through the front contact 180. The relay 2ROP is held picked up by a stick circuit which extends from (+) and includes front contact 182 of relay MRO, front contact 181 of relay 2ROP and the winding of relay 2ROP to (−).

The picking up of the relay 2ROP in combination with the position of the other ROP relays arranged in the circuit causes the master route determining relay 3–17MRD to be picked up by a circuit which extends from (+) and includes back contact 190 of relay 1ROP, front contact 191 of relay 2ROP, back contact 192 of relay 3ROP, back contact 193 of relay 4ROP, wire 193', wire 345' and the winding of relay 3–17MRD to (−). With the picking up of the master route determining relay for the route from signal 3 to 17, the remainder of the operation is identical to that described in connection with the manual operation of the system.

When the relay MRO picked up in response to the picking up of relay 62TNT, the readback relay RB was dropped away by the opening of front contact 177 of relay MRO. The dropping away of the relay RB applied +½ I current to the row R9 of the matrix over a circuit which includes back contact 179 of the relay RB, back contact 155 of the relay RI, and front contact 156 of the relay 62TNT. Simultaneously, it applied a +½ I current to column CN1 of the matrix M by a circuit which extends from the +½ I source and includes back contact 183 of the relay RB, back contact 184 of the relay RI, front contact 185 of the relay 2ROP and the wire leading to the column CN1. Thus, the core 20A is again placed in its "one" state to be stored indefinitely. It should be noted that the relays RB and 62TNT are slow drop away relays to insure that the core 20A will be switched to its "zero" state before it is again placed in its "one" state.

When the train No. 6 leaves the track section 3T, the track repeater relay will pick up and open the energizing circuit for the relay 62TNT at back contact 165 of the relay 3TP. The picking up of relay 62TNT breaks the stick circuit for the relay TN6, hereinbefore described.

When the relay MRO drops away, its back contact 203 closes, which applies a reset bias over wire 106' to restore the multivibrators MV1 through MV4, in this example MV2, to their normal condition. This deenergizes the respective RO relays, which in this example is relay 2RO.

*Cancelling stored routes*

In the event that the operator wishes to cancel all of the route information stored in various cores 20 of the matrix M he presses the buttons MC1PB and MC2PB simultaneously. The pressing of these two buttons energizes the relay MC by an obvious circuit (FIG. 3A) thus causing front contacts 108, 109, 110 and 111 to close which applies a —I current value to the rows R0 through R9 of the matrix M. This cancelling of the information stored in the cores 20 of the matrix M will not effect the multivibrators MV1 through MV4 because the reset bias is maintained to the multivibrators through the back contact 203 of the relay MRO.

In the event that an operator wishes to cancel information which is stored in the matrix M for one or more trains or for a particular route for one identified train he pushes the button CSUPB, then pushes the particular button T1PB or T2PB and either TN5PB or TN6PB. The buttons TPB and TNPB which are pushed must be held in to maintain the appropriate TNT relay picked up. Assuming that the route commencing from track 2 for train No. 6 is to be cancelled the relay 62TNT is held picked up. With these buttons depressed he then pulls the button RI-CCPB which picks up the relay CC by a circuit which extends from (+) and includes front contact 101 of push button RI-CCPB, front contact 106 of relay CSUPBP, and the winding of relay CC to (—). The picking up of the relay CC applies a —I current through front contact 126 of relay CC, back contact 178 of relay MRO, front contact 179 of relay RB, back contact 155 of relay RI, front contact 156 of relay 62TNT and the wire leading to the row R9 of the matrix M. He then releases the buttons T2PB and TN6PB and presses the reset button RS–PB. Thus, a —I current is able to cancel only those cores in the rows R as selected by the operator without disturbing the other route information stored in the matrix. The button RS–PB may be depressed anytime that the operator wishes to reset the system after a route is being stored therein prior to the changing of the cores from a "zero" to a "one" state or when a route is being manually set up in this system.

It should be noted that each individual PBP relay may be dropped away by pulling its associated button which energizes its lower winding for opening the front contacts of the relay. This is clearly illustrated in FIGS. 3B and 3D.

It is understood, that a matrix such as M may have more or less rows and columns than illustrated herein in accordance with the requirements of practice. Also, that there may be more or less multivibrators MV to operate other combinations and numbers of relays RO. It is also understood, that the various other types of memory devices of read-out apparatus may be substituted for the ferrite core matrix and the multivibrators, and the push buttons therewith may be more or less in number than shown herein according to the requirements of practice.

Thus, I have provided an improved switch and signal system for railroads of the entrance-exit type wherein the operator is capable of programming traffic movements over practically any track layout at any time in advance of the arrival of the trains. It is also apparent, that I have provided a system wherein the stored route information for a particular train automatically sets up that particular route upon the arrival of the train at the entrance to the area governed by this system. It is apparent from the circuitry herein that various back and front contacts, as the case may be have been provided in the circuitry of the system so as to insure that any failure of any apparatus in the interlocking plant or in the system of the present invention will not in any way create a dangerous traffic condition.

Having described one embodiment of the present invention, it is desired to be understood that this form is selected to facilitate in the disclosure of the invention rather than to limit the number of forms the invention may assume and it is to be further understood that various alterations, adaptations and modifications may be applied to the specific form shown to meet the requirements of practice without in any manner departing from the spirit or scope of the present invention except as limited by the appended claims.

What I claim is:

1. A switch and signal control system for a track layout having a plurality of different and conflicting routes and being of the type having a route establishing means effective when activated to operatively control the switches and signals for a designated route comprising,
   (a) a matrix having a plurality of magnetic cores each of which has a normal state and input and output means and the cores being
      (1) operative to store the identity of a distinct route through said track layout upon changing the state of selected cores by energizing their input means with an effective current of one polarity and of predetermined magnitude and operative to cancel said stored route identity upon restoring the cores to their normal state by energizing the input means with current of opposite polarity and said predetermined magnitude,
      (2) the output means of each core that is in a changed state being effective to emit a signal upon the energizing of its input means with current of said opposite polarity,
   (b) train identity means controlled by the approach of a train to the track layout for registering the identity of the approaching train,
   (c) read-out circuit means responsive to a train identity registered by said train identity means and including the output means of each of said cores effective to energize a selected one of said input means with current of opposite polarity upon the presence of a particularly identified train approaching the track layout to selectively activate the route establishing means by said emitted signal, and
   (d) read-back circuit means including said read-out circuit means and said selected input means effective to energize said selected input means with current of said one polarity and predetermined magnitude in response to the operation of said read-out circuit means.

2. A switch and signal control system for a track layout having a plurality of different and conflicting routes and being of the type wherein each route is selectively designated by the operation of manual route designating means at a remotely located control office and having route establishing means when activated selectively to operatively control the switches and signals for a designated route comprising,
   (a) a matrix having a plurality of magnetic cores each of which is operable to be energized from an off to an on state and vice versa,
   (b) an input means for each of said cores operative to energize at least one selected core to the on state upon being electrically connected momentarily to a source of current of predetermined magnitude of one polarity,
   (c) an output means for each of predetermined groups of cores operatively energized upon the energizing of one core within each said group to its off state in response to a selected portion of the input means being electrically connected momentarily to a source of current of predetermined magnitude of opposite polarity, (d) train identifying means operative to be conditioned for manually designating a train and operative to be conditioned upon the approach of the identified train to the track layout, (e) read-in circuit means including said train identifying means and the manual route designating means and a source of energy of said one polarity and said input means effective to energize at least one predetermined core to its on state upon the conditioning of both said train identifying means and said route designating means to store the identity of a route for a particular identified train, (f) read-out circuit means including a source of current of said opposite polarity and said input means and said train identifying means when conditioned effective to energize at least one same said core to its off state upon the approach of a particularly identified train to the track layout thereby energizing said output means connected to at least one of said predetermined groups, and (g) circuit means including said output means effective to selectively activate the route establishing means in response to the energizing of distinct output means to set up a route corresponding to a stored route identity, and (h) read-back circuit means including said input means and said last named circuit means and a source of energy of said one polarity responsive to the activation of said output means to energize at least said one same core to its on state.

3. A switch and signal control system for a track layout having a plurality of different and conflicting routes and being of the type having route establishing means effective when activated to operatively control the switches and signals for a designated route comprising, (a) a matrix having a plurality of magnetic cores arrayed in rows and columns operable to be selectively energized from an off to an on state and vice versa, (b) an output means for each column of said matrix, (c) an input means for each row and column of said matrix, (1) operative to energize at least one selected row and column of said matrix thereby changing at least one core disposed at the intersection of said selected row and column to the on state upon being electrically connected momentarily to a source of current of a predetermined magnitude and one polarity, and (2) operative to change at least one of said selected energized cores to the off state upon at least one of said selected rows being electrically connected momentarily to a source of current of a predetermined magnitude of opposite polarity, the momentary electrical connecting of said input means to said source of current of opposite polarity also being effective to energize said output means connected to said columns containing said selected changed cores, (d) circuit means including said output means and said route establishing means to activate selectively said route establishing means to control the switches and signals for a distinct route upon the selective energizing of the output means, (e) train identification circuit means including a source of current of said opposite polarity and said input means effective to energize the input means of at least one of said selected rows and said current of said opposite polarity upon the approach of an identified train, and (f) read-back circuit means including a source of current of said one polarity and said input means including at least one of said selected rows and columns effective to energize at least one of said distinct cores to its on state immediately after the energizing of said output means, (g) whereby the presence of an identified train causes at least one distinct core to be energized from its on to its off state to control the switches and signals for a distinct route and thereafter said read-back means causes at least one of said distinctively energized cores to be energized from its off to its on state for thereafter causing the distinct operation of the switches and signals when the same identified train again approaches the track layout.

4. A switch and signal control system for a track layout having a plurality of different and conflicting routes and being of the type wherein each route is selectively designated by the operation of manual route designating means at a remotely located control office, and having route establishing means when activated selectively to operatively control the switches and signals for a designated route, comprising (a) manually operable train identifying means at the control office, (b) a matrix having a plurality of magnetic cores arrayed in rows and columns each core of which is operative to be energized from an off to an on state and vice versa, (c) a first source of energy of one polarity, (d) a second source of energy of said one polarity, (e) a third source of energy of opposite polarity, (f) first input means for said matrix operative to be selectively electrically connected to any one of said rows, (g) second input means for said matrix operative to be selectively electrically connected to one or more of said columns, (h) output mans for each of said columns of said matrix, (i) first circuit means including said first source of energy operative to energize through said first input means a selected one of said rows upon the operation of said train identifying means, (j) second circuit means including said second source of energy opertive to energize through said second input means a selected one or more of said columns upon the operation of said manual route designating means, (k) the simultaneous energizing of said first circuit means and said second circuit means being effective to change the condition of the cores disposed at the intersections of said selected row and columns thereby storing the identity of a distinct route for an identified train within said matrix, (l) train describer means effective to momentarily connect electrically said third source of energy through said first input means to said selected row as selected by said manually operable train identification means for this identified train upon the approach of said identified train, (m) said third source of energy effective when momentarily connected through said first input means to energize said core from its on to its off state, (n) at least one of said output means being energized by the effective output from at least one column associated with at least one core being changed from an on to an off state, (o) read-out circuit means activated in response to the energizing of said output means to selectively activate the route establishing means, (p) and read-back circuit means including said read-out circuit means, said train describer means, and said first and second circuit means being effective to re-energize the previously selected cores from their off to their on state upon the activation of said read-out circuit means, thereby restoring into said matrix the original stored data.

5. A switch and signal control system for a track layout having a plurality of different and conflicting routes and being of the type having route establishing means effective when activated to operatively control the switches and signals for a designated route, comprising
   (a) route for designating said plurality of routes respectively designating means,
   (b) route identity storage means for storing the identities of the respective routes designated,
   (c) normally inactive read-in circuit means operative when activated momentarily upon the operation of said route designating means to store indefinitely the identity of a distinct route in said storage means,
   (d) train identify means controlled by the approach of a train to the track layout for registering the identity of the approaching train,
   (e) normally open route selecting circuit means operative when when closed to activate the route establishing means selectively as governed by said storage means to set up a distinct route through the track layout,
   (f) normally open read-out circuit means controlled by said train identity means and said storage means being momentarily closed to close said route selecting circuit means in accordance with the identity of a route stored in said storage means corresponding to a train identity registered in said train identity means upon the approach of a train to the track layout only when said read-in circuit means is inactive, and
   (g) means effective to hold said read-in circuit means inactive during the time said read-out circuit means is closed.

6. A system as claimed in claim 5 comprising bypass circuit means operative to close said route selecting circuit means for a non-conflicting route upon the operation of said route designating means when said read-in circuit means is inactive and when said read-out circuit means is either open or closed.

7. A system as claimed in claim 5 comprising read-back circuit means effective when closed to store in said storage means the distinct route that is read out by said read-out circuit means upon the closing of said read-out circuit means, and further comprises means effective to hold said read-in circuit means inactive when said read-back circuit means is closed.

8. A system as claimed in claim 5 wherein said route storage means is a matrix having a plurality of magnetic cores each of which is operable to be energized from an off to an on state and vice versa, each of said cores having an input means and an output means,
   (a) a first source of energy of one polarity,
   (b) a second source of energy of opposite polarity,
   (c) said read-in circuit means momentarily connecting electrically said first source of energy to said input means to energize at least one of said cores to its on state upon the activation of said read-in circuit means,
   (d) said read-out circuit means momentarily connecting electrically said second source of energy to said input means upon the closing of said read-out circuit means to energize each of said previously energized cores to its off state to effectively energize said output means, and wherein the energizing of said output means closes said route selecting means.

9. A system as claimed in claim 8 wherein the read-back circuit means is effective when momentarily closed to connect electrically said first source of energy to said input means, thereby storing in said storage means the distinct route that is read-out by said read-out circuit means upon the closing of said read-out circuit means, and means effective to hold said read-in circuit means inactive when said read-back circuit means is closed.

10. A switch and signal control system for a track layout having a plurality of different and conflicting routes and being of the type wherein each route is selectively designated by the operation of a route designating means, each of said routes having a signal at opposite ends thereof and at least one intermediate signal, thereby to divide the route into at least two adjacent sections, said system comprising
   (a) route selection means for each of said routes effective when activated to select a distinct route,
   (b) sectional route establishing means for each route effective when activated to control operatively the signals at opposite ends of a respective section,
   (c) route storage means operative to randomly store indefinitely the identities of a plurality of individual conflicting routes,
   (d) normally inactive read-in circuit means for at times connecting operatively said storage means to said route designating means for activating said storage means in accordance with the condition of the route designating means,
   (e) train identity means controlled by the approach of a train to each section in a route for registering the identity of the approaching train,
   (f) read-out circuit means response to a train identity registered by said train identity means effective to activate a selected one of said route selection means upon the presence of a train approaching the first section in said selected route in accordance with a route identity storage in said storage means,
   (g) means holding said route selection means activated while a train is travelling through said selected route, and
   (h) circuit means responsive to the presence of a train approaching each section and the activated route selection means effective to activate each sectional route establishing means in sequence ahead of the train as the train is travelling through said selected route, and to prevent the selection of other sectional conflicting routes.

11. A system as claimed in claim 10 comprising means when actuated operative to hold said read-in circuit means inactive, and a circuit means including the actuated holding means and said route selecting means effective to activate one of said route selecting means upon the operation of a corresponding route designating means when said holding means is actuated.

12. A system as claimed in claim 10 comprising readback circuit means effective to store the route in said storage means upon the activation of the read-out circuit means identical to the individual route selecting means activated by said read-out circuit means.

13. A system according to claim 10 wherein each sectional route establishing means includes a sectional route determining means operative to be activated upon the activation of a respective route selection means,
   (a) a first electrically operated means for governing signals at the entrance of each section,
   (b) a second electrically operated means for governing the signals at the exit from each section, and
   (c) means responsive to the activation of each sectional route determining means effective to operate the first and second electrical means in sequence.

14. A system as claimed in claim 10 wherein said route storage means is a matrix having a plurality of magnetic cores provided with an input means and an output means, each of said input means being included in said read-in circuit means and each of said output means being included in said read-out circuit means.

15. A switch and signal control system for a track layout having a plurality of conflicting routes which can be respectively established by the power operation of track switches comprising,
   (a) route designating means for designating routes to be established for respective trains,
   (b) route identity storage means for randomly storing contemporaneously the identities of a plurality of conflicting routes corresponding to routes for respective trains designated by said route designating means, (c) identity registration means responsive to the passage of a train for registering the identity of a train approaching the entering end of each route.

(d) route selecting means controlled jointly by said identity registration means and by said route identity storage means for selecting the positions of track switches required for the establishment of a route.

(e) and route establishing means controlled by said route selecting means for operating the track switches as required in said track layout to establish a route emanating from the point of approach of the train in the track layout.

16. A switch and signal control system according to claim 15 wherein said route identity storage means continues to store the identity of each route after that route has been established.

17. A switch and signal control system according to claim 15 wherein said route identity storage means is a magnetic core matrix.

18. A switch and signal control system for a track layout having a plurality of different and conflicting routes and being of the type having route establishing means effective when activated to operatively control certain of the switches and signals for a designated route comprising, (a) train identity means controlled by the approach of a train to the track layout for registering the identity of the approaching train, (b) route storage means operative to randomly store contemporaneously the identities of a plurality of predetermined conflicting routes through the track layout, (c) readout circuit means responsive to a train identity registered by said train identity means to cause the storage means to selectively activate the route establishing means in accordance with a predetermined stored route identity and to cancel said predetermined stored route identity in the storage means, and (d) readback circuit means responsive to said readout circuit means for restoring said cancelled route identity in said storage means.

References Cited by the Examiner

UNITED STATES PATENTS

| | | | |
|---|---|---|---|
| 2,576,038 | 11/1951 | Pascoe | 246—134 |
| 2,592,704 | 4/1952 | Jerome | 246—5 |
| 2,628,572 | 2/1953 | LeGoff | 246—182 |
| 2,649,536 | 8/1953 | Preston | 246—134 |
| 2,673,292 | 3/1954 | Treharne | 246—2 |
| 2,784,391 | 3/1957 | Rajchman | 340—174 |
| 2,800,579 | 7/1957 | Martin | 246—134 X |
| 2,809,367 | 10/1957 | Stuart-Williams | 340—174 |
| 2,817,012 | 12/1957 | Kendall | 246—2 |
| 2,863,991 | 12/1958 | Mishelevich | 246—2 |
| 2,863,992 | 12/1958 | Geore | 246—2 |
| 2,900,497 | 8/1959 | Vande-Sande | 246—2 |
| 2,910,578 | 10/1959 | Karlet | 246—2 |
| 2,914,662 | 11/1959 | Preston | 246—134 |
| 2,916,612 | 12/1959 | Marple | 246—3 |

FOREIGN PATENTS 835,955    5/1960    Great Britain.

EUGENE G. BOTZ, *Primary Examiner.*

JAMES S. SHANK, LEO QUACKENBUSH, *Examiners.*